US009651192B2

(12) United States Patent
McCallum et al.

(10) Patent No.: US 9,651,192 B2
(45) Date of Patent: May 16, 2017

(54) APPARATUS FOR SUPPORTING A WORKPIECE

(71) Applicant: Norgren Automation Solutions, LLC, Saline, MI (US)

(72) Inventors: Scott R. McCallum, St. Clair, MI (US); Timothy John Key, Onsted, MI (US); James R. Kalb, Petersburg, MI (US); Michael A. Filipiak, Ann Arbor, MI (US)

(73) Assignee: Norgren Automation Solutions, LLC, Saline, MI (US)

( * ) Notice: Subject to any disclaimer, the term of this patent is extended or adjusted under 35 U.S.C. 154(b) by 438 days.

(21) Appl. No.: 13/917,016

(22) Filed: Jun. 13, 2013

(65) Prior Publication Data

US 2013/0334379 A1 Dec. 19, 2013

Related U.S. Application Data

(60) Provisional application No. 61/724,067, filed on Nov. 8, 2012, provisional application No. 61/658,993, filed on Jun. 13, 2012.

(51) Int. Cl.
*F16M 13/00* (2006.01)
*B21D 37/02* (2006.01)
(Continued)

(52) U.S. Cl.
CPC ............. *F16M 13/00* (2013.01); *B21D 37/02* (2013.01); *B23K 37/04* (2013.01); *B23Q 1/032* (2013.01);
(Continued)

(58) Field of Classification Search
CPC ........ B23Q 1/035; B23Q 1/037; B23Q 3/062; B23Q 3/084; B23Q 3/00; B25B 11/005
See application file for complete search history.

(56) References Cited

U.S. PATENT DOCUMENTS 3,318,486 A    5/1967  Felix
3,396,851 A    8/1968  Buckner et al.
(Continued)

FOREIGN PATENT DOCUMENTS

DE        4037132 A1    5/1992
WO     2004054734 A1    7/2004
(Continued)

OTHER PUBLICATIONS

International Search Report and Written Opinion, PCT/US2013/045648, mailed Aug. 19, 2013.

*Primary Examiner* — Monica Carter
*Assistant Examiner* — Seahee Yoon
(74) *Attorney, Agent, or Firm* — Young Basile Hanlon & MacFarlane, P.C.

(57) ABSTRACT

An apparatus for supporting a workpiece includes a master template, a locking assembly and a plurality of substantially planar gauge slice templates. The master template includes a plurality of positioning features. The locking assembly is connected to the master template and is movable with respect to the master template between a locked position and an unlocked position. The gauge slice templates are each associated with a workpiece engaging structure that is engageable with the workpiece for supporting the workpiece. Each gauge slice template releasably engages at least one positioning feature of the master template. Each gauge slice template engages the locking assembly, wherein the gauge slice templates are not moveable with respect to the master template when the locking assembly is in the locked position, and the gauge slice templates are moveable with respect to the master template when the locking assembly is in the unlocked position.

17 Claims, 17 Drawing Sheets

(51) Int. Cl.
  *B23Q 1/03* (2006.01)
  *B23K 37/04* (2006.01)
  *B25B 11/00* (2006.01)
  *B25B 1/02* (2006.01)
  *B64F 5/10* (2017.01)

(52) U.S. Cl.
  CPC ............... *B25B 1/02* (2013.01); *B25B 11/00* (2013.01); *B25B 11/007* (2013.01); *B64F 5/10* (2017.01)

(56) References Cited

U.S. PATENT DOCUMENTS

| | | | |
|---|---|---|---|
| 3,744,647 A | 7/1973 | Jelinek | |
| 3,926,422 A * | 12/1975 | Wilson | B23K 37/04 269/218 |
| 4,241,906 A * | 12/1980 | Cole | B25B 1/02 269/153 |
| 4,381,104 A * | 4/1983 | Nelsen | A63H 27/02 269/101 |
| 4,448,406 A * | 5/1984 | Hallberg | B25B 1/103 269/224 |
| 4,583,724 A * | 4/1986 | Huang | B25B 1/20 269/182 |
| 4,641,515 A | 2/1987 | Braun et al. | |
| 4,936,560 A | 6/1990 | Barozzi | |
| 5,033,178 A * | 7/1991 | Woods | B25B 11/00 29/243.57 |
| 5,236,183 A * | 8/1993 | Curtis | A63C 11/04 269/242 |
| 5,330,167 A * | 7/1994 | Plumb | B25B 1/06 269/153 |
| 5,887,733 A * | 3/1999 | Harvey | B23Q 3/103 211/182 |
| 6,062,553 A * | 5/2000 | Strehl | B25B 1/2452 269/153 |
| 6,105,948 A * | 8/2000 | Young | B25B 1/103 269/244 |
| 6,386,805 B1 * | 5/2002 | Suzuki | B23Q 1/035 269/21 |
| 6,606,955 B2 | 8/2003 | Warren | |
| 6,896,249 B1 * | 5/2005 | Ferrara | B25B 1/12 269/138 |
| 7,942,394 B2 * | 5/2011 | Moncavage | B23Q 1/035 269/21 |
| 8,109,493 B2 * | 2/2012 | Koskovich | B27F 7/155 269/37 |
| 9,440,371 B2 * | 9/2016 | van Valkenburg | B23D 47/04 |
| 2008/0203640 A1 | 8/2008 | Halford | |
| 2009/0140482 A1 * | 6/2009 | Saberton | B23Q 1/035 269/296 |

FOREIGN PATENT DOCUMENTS

WO 2007022143 2/2007
WO 2007022143 A1 2/2007

* cited by examiner

APPARATUS FOR SUPPORTING A WORKPIECE

CROSS-REFERENCE TO RELATED APPLICATIONS

This application claims the benefit of U.S. Provisional Patent Application No. 61/724,067, which was filed on Nov. 8, 2012, and is incorporated herein by reference in its entirety. This application also claims the benefit of U.S. Provisional Patent Application No. 61/658,993, which was filed on Jun. 13, 2012, and is incorporated herein by reference in its entirety.

TECHNICAL FIELD

The disclosure herein relates to an apparatus for supporting a workpiece, such as a sheet metal panel.

BACKGROUND

In the manufacturing industry, such as the automotive industry, workpieces, such as sheet metal panels, are often gauged and nested in idle stations between machining operations, such as stamping operations in the case of sheet metal panels. The sheet metal panels are often supported by a plurality of nylon templates, which are attached to and secured in position by holder brackets. The holder brackets are typically spaced from one another and are connected to and supported by a table or support structure. The nylon templates have predetermined configurations such that when placed in the holder brackets, the nylon templates may support the sheet metal panel when the sheet metal panel is set on top of the nylon templates. For instance, the nylon templates may assume "I," "H," and/or "T" shaped configurations to support the sheet metal panel in strategic locations such that when a workpiece handling device, such as vacuum cups, engage the sheet metal panel, the sheet metal panel does not dent or deform in response to the forces applied by the vacuum cups to the sheet metal panel.

In order to adjust to various shapes of sheet metal panels, such as in the case of different models of automobiles, different shapes of nylon templates may be created for supporting the different models or shapes of the sheet metal panels. The holder brackets are designed to releasably engage the nylon templates so that different-shaped nylon templates can be interchanged upon manufacturing different models of the sheet metal panels. The holder brackets may receive the nylon templates in a slotted block configuration, wherein removable pins are inserted through aligned apertures in the holder bracket and the nylon template. Thus, upon the removal and insertion of the pins, the nylon templates may be easily connected to and removed from the holder brackets.

As previously noted, different nylon templates having different configurations must be utilized for different-shaped sheet metal panels. Therefore, a manufacturing facility may utilize many different nylon templates depending on the number of different sheet metal panels that the facility may be producing. When the nylon templates are not being utilized by not being connected to the holder brackets, the nylon templates must be stored within the production facility. Due to the bulkiness and unusual shapes of the nylon templates, there is no simple and organized manner in which to store the nylon templates. Many of the nylon templates are commonly stored in large bins, wherein the nylon templates are simply piled on top of one another in an unorganized fashion. This leads to an unsightly and inefficient method of storing the nylon templates, which may lead to damaging the nylon templates while also requiring additional time to find the appropriate nylon templates when exchanging the nylon templates for different sheet metal panel configurations. In addition, the removeable pins in the holder brackets are often removed and misplaced, thereby preventing the nylon templates from being locked into the holder brackets.

It would be desirable to create an apparatus for supporting a sheet metal panel that provided a simple and accurate means in which to support a sheet metal panel while also providing an efficient and orderly manner in which to store the apparatus when not in use.

SUMMARY

The disclosure herein is directed to methods and apparatuses for nesting or supporting a workpiece while also allowing for efficient and organized storage of components when not in use.

One aspect of the disclosed embodiments is an apparatus for supporting a workpiece. The apparatus includes a master template, a locking assembly and a plurality of substantially planar gauge slice templates. The master template includes a plurality of positioning features. The locking assembly is connected to the master template and is movable with respect to the master template between a locked position and an unlocked position. The gauge slice templates are each associated with a workpiece engaging structure that is engageable with the workpiece for supporting the workpiece. Each gauge slice template releasably engages at least one positioning feature of the master template. Each gauge slice template engages the locking assembly, wherein the gauge slice templates are not moveable with respect to the master template when the locking assembly is in the locked position, and the gauge slice templates are moveable with respect to the master template when the locking assembly is in the unlocked position.

Another aspect of the disclosed embodiments is an apparatus for supporting a workpiece that includes a base structure, a substantially planar master template that is connected to the base structure and includes a plurality of positioning features, a locking assembly that is connected to the master template and is movable with respect to the master template between a locked position and an unlocked position, and a plurality of substantially planar gauge slice templates. Each gauge slice template is associated with a workpiece engaging structure that is engageable with the workpiece for supporting the workpiece. Each gauge slice template includes an engaging feature for releasable engagement with a respective positioning feature from the plurality of positioning features of the master template. The engaging features and the positioning features cooperate to define a predetermined longitudinal position for each gauge slice template with respect to the master template. The gauge slice templates are not moveable with respect to the master template when the locking assembly is in the locked position. The gauge slice templates are moveable with respect to the master template when the locking assembly is in the unlocked position.

Another aspect of the disclosed embodiments is an apparatus for supporting a workpiece that includes a base structure, a substantially planar master template that is connected to the base structure and includes a plurality of positioning features, a locking rod that is rotatably connected to the base structure rotatable with respect to the master template between a locked position and an unlocked position, and a plurality of substantially planar gauge slice templates. Each gauge slice template is associated with a workpiece engaging structure that is engageable with the workpiece for supporting the workpiece. Each gauge slice template releasably engages at least one positioning feature of the master template, and each gauge slice template has a keyway in which the locking rod is received for engaging the locking rod. The locking rod is moveable into and out of the keyway of each gauge slice template when the locking rod is in the unlocked position, the locking rod is retained within the keyway of each gauge slice template when the locking rod is in the locked position, each positioning feature from the plurality of positioning features corresponds to a predetermined longitudinal position for a respective gauge slice template from the plurality of gauge slice templates, and each of the gauge slice templates includes an engaging feature for engagement with a respective positioning feature from the plurality of positioning features of the master template.

BRIEF DESCRIPTION OF THE DRAWINGS

The various features, advantages and other uses of the present apparatus will become more apparent by referring to the following detailed description and drawings in which.

DETAILED DESCRIPTION

The disclosure herein relates to an apparatus for accurately supporting a workpiece while also allowing for an efficient and organized method for storing the apparatus when not in use. In some of the implementations shown herein, the apparatus is used in the context of gauging and/or nesting of a workpiece, such as a sheet metal panel, when the workpiece is idle in between workstations, such as various stamping press operations. In other implementations, the apparatus can be utilized as tooling for engaging the workpiece in an automated workpiece transport system.

Although the apparatus 10 may be used for various workpieces, the apparatus is particularly suited for use with sheet metal panels, since sheet metal panels are commonly transferred between workstations through the use of workpiece handling equipment, such as vacuum cups. When the workpiece handling equipment engages the sheet metal panel, pressure may be applied to the sheet metal panel by the vacuum cups prior to engaging and disengaging the sheet metal panel. Due to the large size and the relatively thin thickness of the sheet metal panel, the sheet metal panel is susceptible to deformation and/or denting by the vacuum cups. Thus, the apparatus provides proper support of the workpiece in strategic locations such that deformation and/or denting of the workpiece does not occur.

Figure 1:
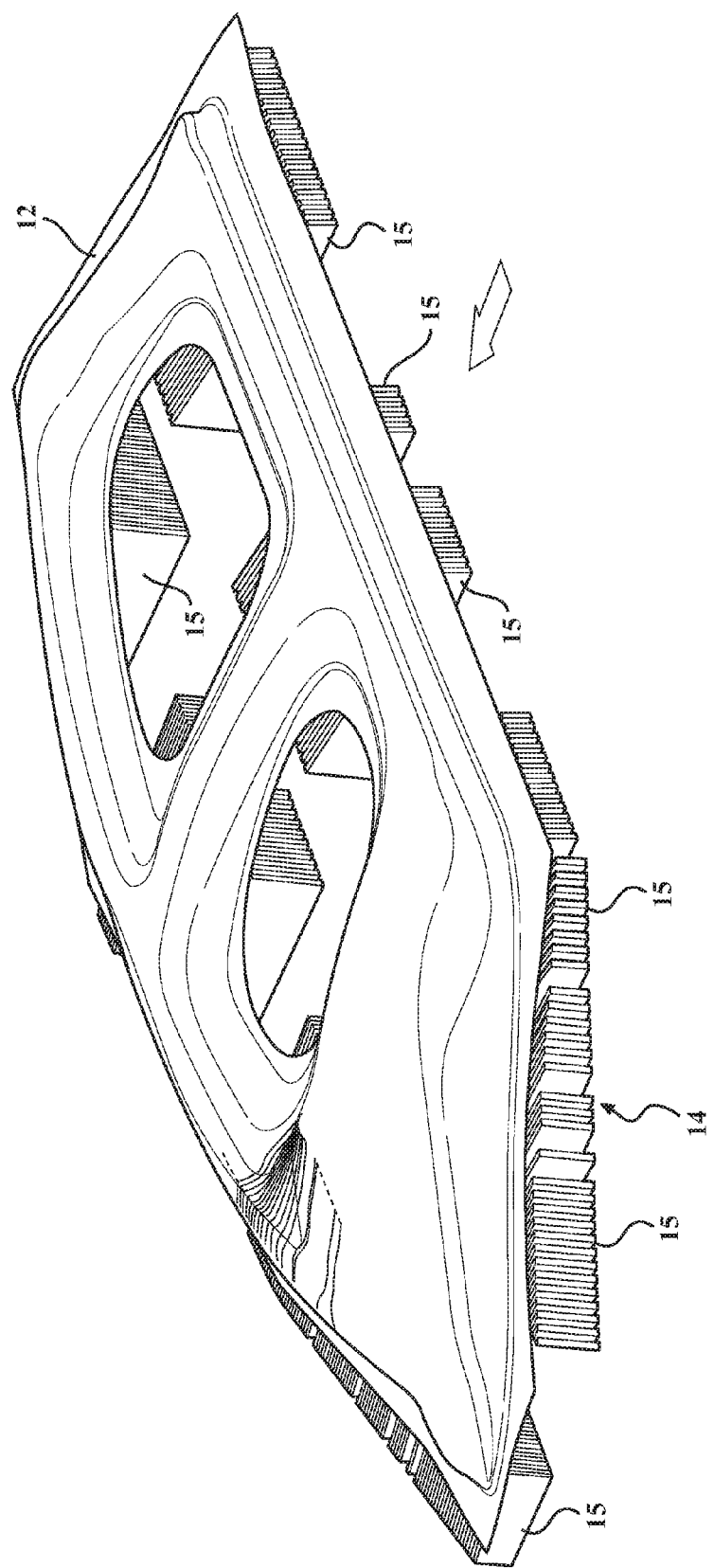
FIG. 1 is a perspective view showing a computer-generated representation of a sheet metal panel and a computer-generated contour model.
Figure 2:
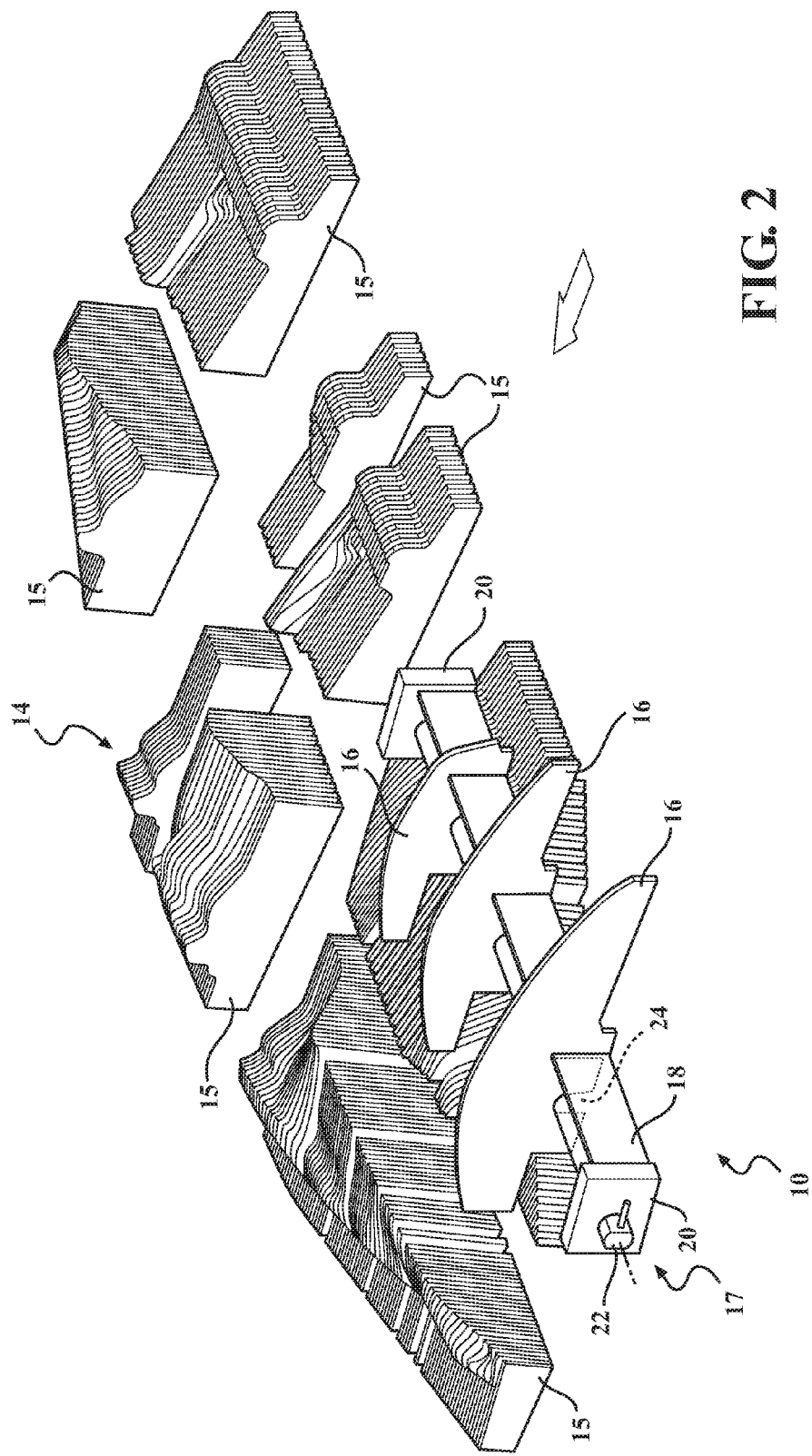
FIG. 2 shows a perspective view of an apparatus for supporting a workpiece in conjunction with the computer-generated contour model.

FIGS. 1-2 show a computer-generated workpiece representation 12, a computer-generated contour model 14 having a contoured surface that is shaped complementarily to the underside of a workpiece 12 that is represented by the computer-generated workpiece representation 12. The computer-generated contour model 14 is divided into individual slices 15 which may correspond to individual and substantially similar gauge slice templates 16 of an apparatus 10 for supporting the workpiece, as shown in FIG. 2. The gauge slice templates 16 are strategically selected and located to properly support the workpiece based on the computer-generated contour model so as to avoid any deformation and/or denting of the workpiece when transferred to and from the apparatus 10.

The gauge slice templates 16 are supported by a substantially planar master template 18 which extends between and is supported by a base structure 17 that includes a pair of similar opposing support members 20. In some implementations, the master template 18 is removably connected to the base structure 17.

In order to secure the gauge slice templates 16 with respect to the apparatus 10, the apparatus 10 can include a locking assembly that is movable between locked and unlocked positions with respect to the gauge slice templates 16, and is operable to engage each of the gauge slice templates 16 to secure them in a fixed position with respect to the master template 18. In one example, the locking assembly includes a locking rod 22 which extends through and between the support members 20. The locking rod 22 also extends through a keyway 24 provided in each of the gauge slice templates 16. The locking rod 22 may rotate between a locked position, wherein the gauge slice templates 16 are locked in a fixed position relative to the apparatus 10, and an unlocked position, wherein the gauge slice templates 16 may be removed from the apparatus 10. Other types of locking assemblies can be utilized. As an example, the locking assembly can include clamps that each engage one of the gauge slice templates 16. As another example, the locking assembly can include releasable pins that each engage one of the gauge slice templates 16. Locking assemblies can be provided using numerous other structures that are able to move between locked and unlocked positions with respect to the gauge slice templates 16 and thus releasably fix the position of the gauge slice templates 16 with respect to the master template 18.

Figure 3:
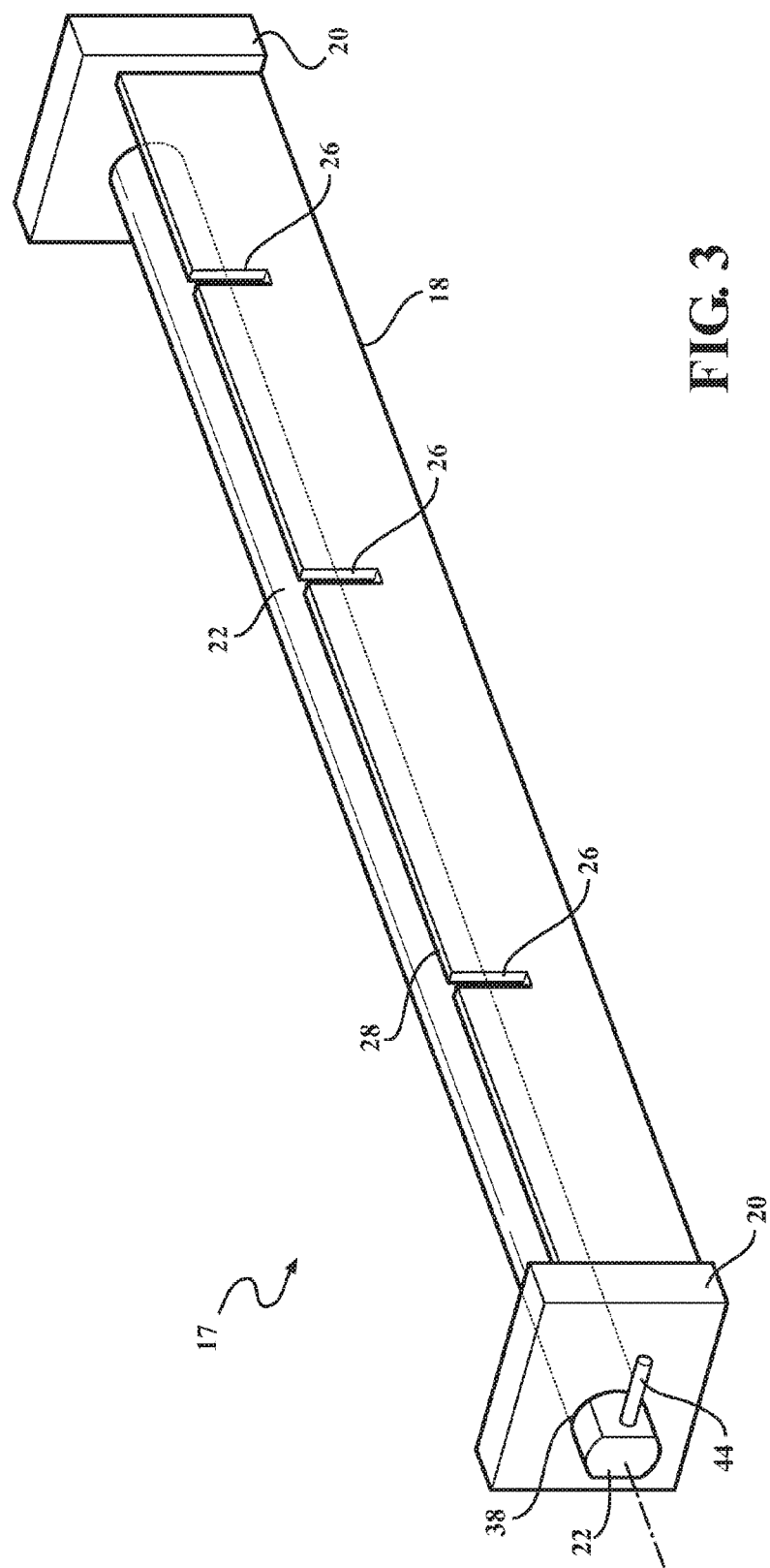
FIG. 3 is a perspective view of a master template and a base structure of the apparatus for supporting a workpiece.
Figure 4:
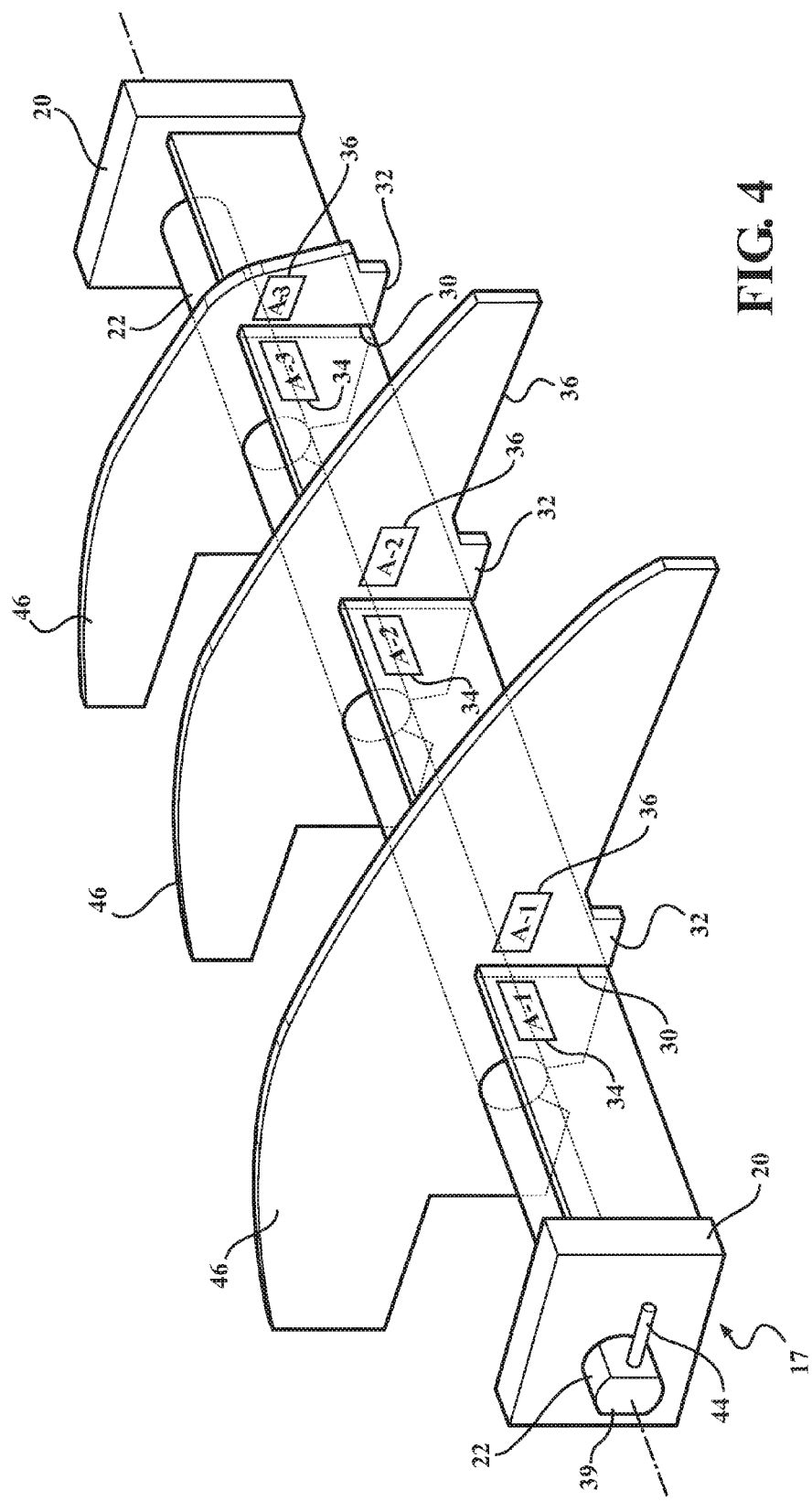
FIG. 4 is a perspective view of the apparatus for supporting a workpiece.

In order to properly support the apparatus 10, the support members 20 of the base structure 17 are connected to a support structure (not shown), such as a table. The support members 20 are connected to the support structure in any conventional manner, such as by conventional fasteners (not shown). As seen in FIGS. 2-4, the support members 20 have a substantially rectangular, block-like configuration, wherein the support members 20 oppose one another in a substantially parallel configuration. The support members 20 may be fabricated from a high-strength material such as steel, aluminum, or a polymeric material.

Figure 5:
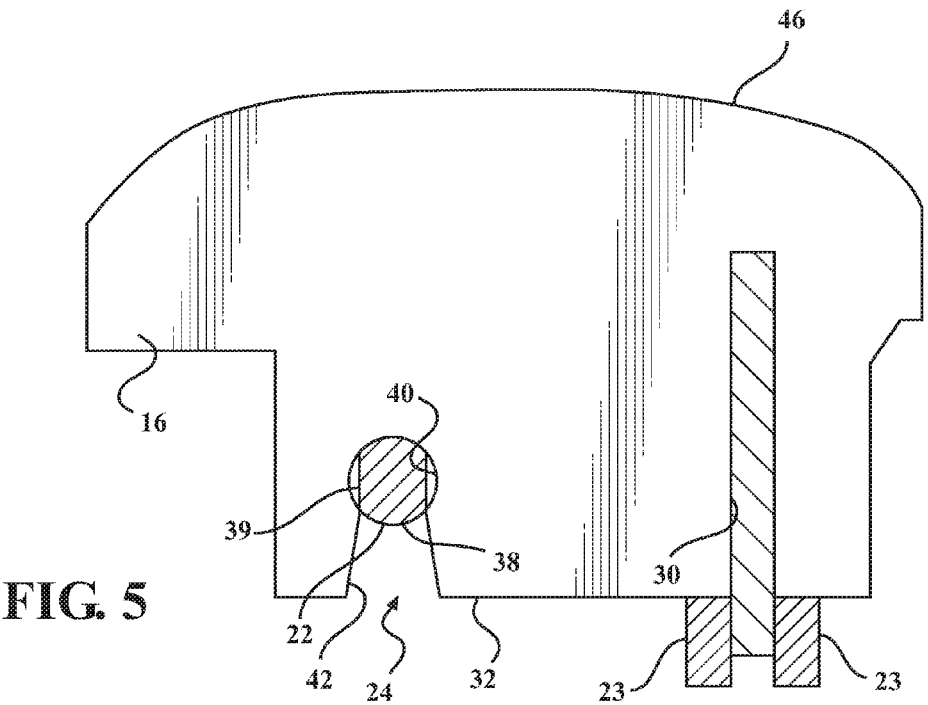
FIG. 5 is a sectional view of the apparatus for supporting a workpiece, wherein a locking rod of the base assembly is in an unlocked position.
Figure 6:
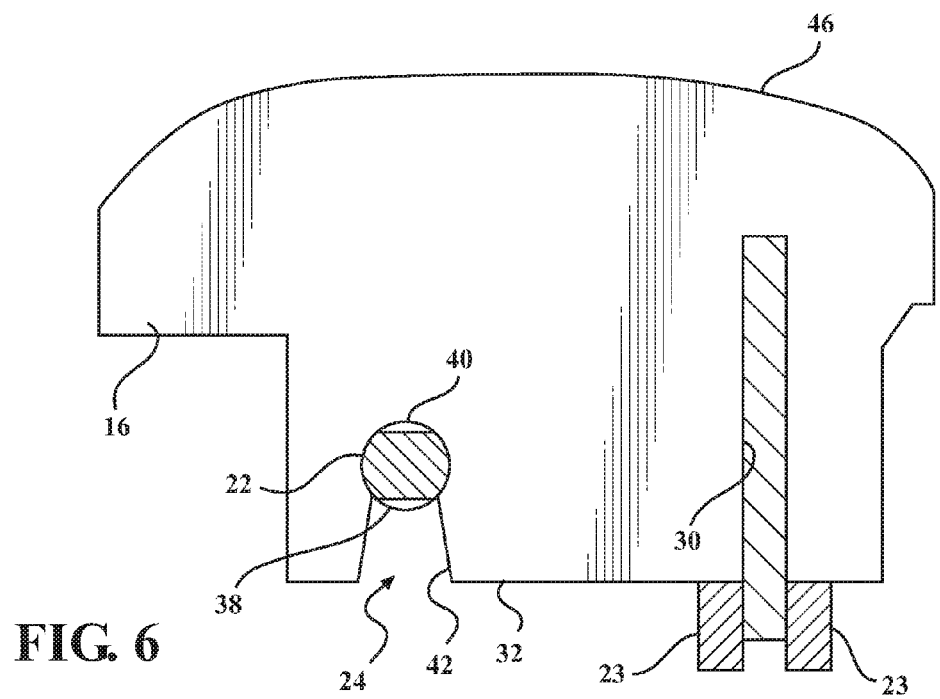
FIG. 6 is a sectional view of the apparatus for supporting a workpiece, wherein the locking rod of the base assembly is in an unlocked position.

To properly locate and support the gauge slice templates 16, the master template 18 has an elongated substantially planar configuration that extends in a longitudinal direction between the support members 20, which are located at first and second ends of the master template 18. As will be explained herein, the master template 18 allows for accurate longitudinal positioning of the gauge slice templates 16 with respect to the apparatus 10. The master template 18 may be fabricated from a high-strength material, such as steel, aluminum, or a polymeric material. The ends of the master template 18 may be received within a slotted aperture provided in the support members 20, as seen in FIGS. 2-4, or the master template 18 may be supported by a pair of opposing legs 23 extending from the support members 20, as shown in FIGS. 5-6. In both configurations, the master template 18 is connected to the support members 20 by conventional fasteners (not shown).

As seen in FIGS. 3-6, the master template 18 of the base structure 17 has open-ended slots 26 formed therein which extend downward from a top edge 28 of the master template 18. The slots 26 are positioned in predetermined positions along the longitudinal direction of the apparatus 10 that correspond to the desired longitudinal positions of the gauge slice templates 16. The gauge slice templates 16 also have an open-ended slot 30 formed therein that extends from a bottom edge 32 of the gauge slice templates 16, which serve as engagement features for engaging the master template 18. The gauge slice templates 16 are inserted into the slots 26 in the master template 18 such that the slots 26 in the master template 18 receive a solid portion of the gauge slice templates 16, and the slots 30 in the gauge slice templates 16 receive a solid portion of the master template 18. When the gauge slice templates 16 are connected to the master template 18, the gauge slice templates 16 extend substantially transverse to the master template 18, such that the planar surfaces of the gauge slice templates 16 extend perpendicular to the planar surface of the master template 18. Each slot 26 in the master template 18 is labeled with an indicia 34 that corresponds to an indicia 36 placed on the gauge slice template 16. By correspondingly mating common indicia 34, 36, the proper gauge slice template 16 can be mated with the appropriate slot 30 in the master template 18 to ensure proper location of the gauge slice templates 16 on the master template. Thus, the slots 26 of the master template 18 serve as positioning features of the master template 18 that define predetermined longitudinal positions for the gauge slice templates 16.

In order to lock and unlock the gauge slice templates 16 into position, the locking rod 22 extends between and through an aperture 38 provided in each of the support members 20, such that the locking rod 22 is rotatably supported within the apertures 38 of the support members 20. The locking rod 22 has a substantially cylindrical configuration with a pair of flats 39 that extend along the length of the locking rod 22. The pair of flats 39 includes two flat surfaces that are substantially parallel to one another and are formed on opposite sides of the locking rod 22. A handle 44, as seen in FIGS. 2-4, may be connected to an end of the locking rod 22 to allow a user to easily rotate the locking rod 22 between a locked position and an unlocked position. The locking rod 22 may be made of any high-strength material, such as aluminum or steel.

The locking rod 22 is configured to be received in and extend through the keyway 24 that is formed in each of the gauge slice templates 16. The keyway 24 includes a substantially circular aperture 40 that extends through the gauge slice templates 16. The keyway 24 also includes a tapered slot 42 that extends through the gauge slice template 16 and extends from the aperture 40 through to the bottom edge 32 of the gauge slice templates 16.

The tapered slot 42 of the gauge slice template 16 allows the gauge slice template 16 to receive the locking rod 22 by passing the locking rod 22 through the tapered slot 42 and into the aperture 40 of the keyway 24 such that the locking rod 22 can be positioned in the substantially circular aperture 40 of the keyway 24. When the flats 39 on the locking rod 22 are in a vertical position, the locking rod 22 is in the unlocked position, as shown in FIG. 5, and the gauge slice template 16 can be slid on and off the locking rod 22. When the locking rod 22 is located in the aperture 40 of the keyway 24, and the locking rod 22 is rotated 90°, such that the flats 39 of the locking rod 22 are substantially horizontal, the locking rod 22 is in the locked position, as shown in FIG. 6, and the gauge slice templates 16 cannot be removed from the locking rod 22, as the tapered slot 42 in the gauge slice template 16 is too narrow to allow the arcuate portions of the locking rod 22 to pass through the tapered slot 42 in the gauge slice template 16. This is defined as the locked position, as the gauge slice template 16 is prohibited from being removed from the locking rod 22.

As seen in FIGS. 4-6, the gauge slice templates 16 have a substantially flat, planar configuration, wherein a top edge or surface 46 of the gauge slice templates 16 has a contoured surface that complementarily and matingly engages the underside surface of the workpiece 12. The contoured surface is an example of a workpiece engaging structure that is associated with the gauge slice templates, in this case being formed on the gauge slice templates 16. The gauge slice templates 16 can be fabricated from a high-strength, low-weight nylon material that has the ability to resist deformation, chipping, and/or breaking. The substantially flat, planar configuration of the gauge slice templates 16 allows the gauge slice templates 16 to be stacked upon one another when not in use, i.e., when the gauge slice templates 16 are disengaged from the base structure 17, thereby allowing the gauge slice templates 16 to be stored in an efficient and organized manner. The indicia 34, 36 also allow the gauge slice templates 16 to be quickly assembled in the proper locations on the apparatus 10.

Figure 7:
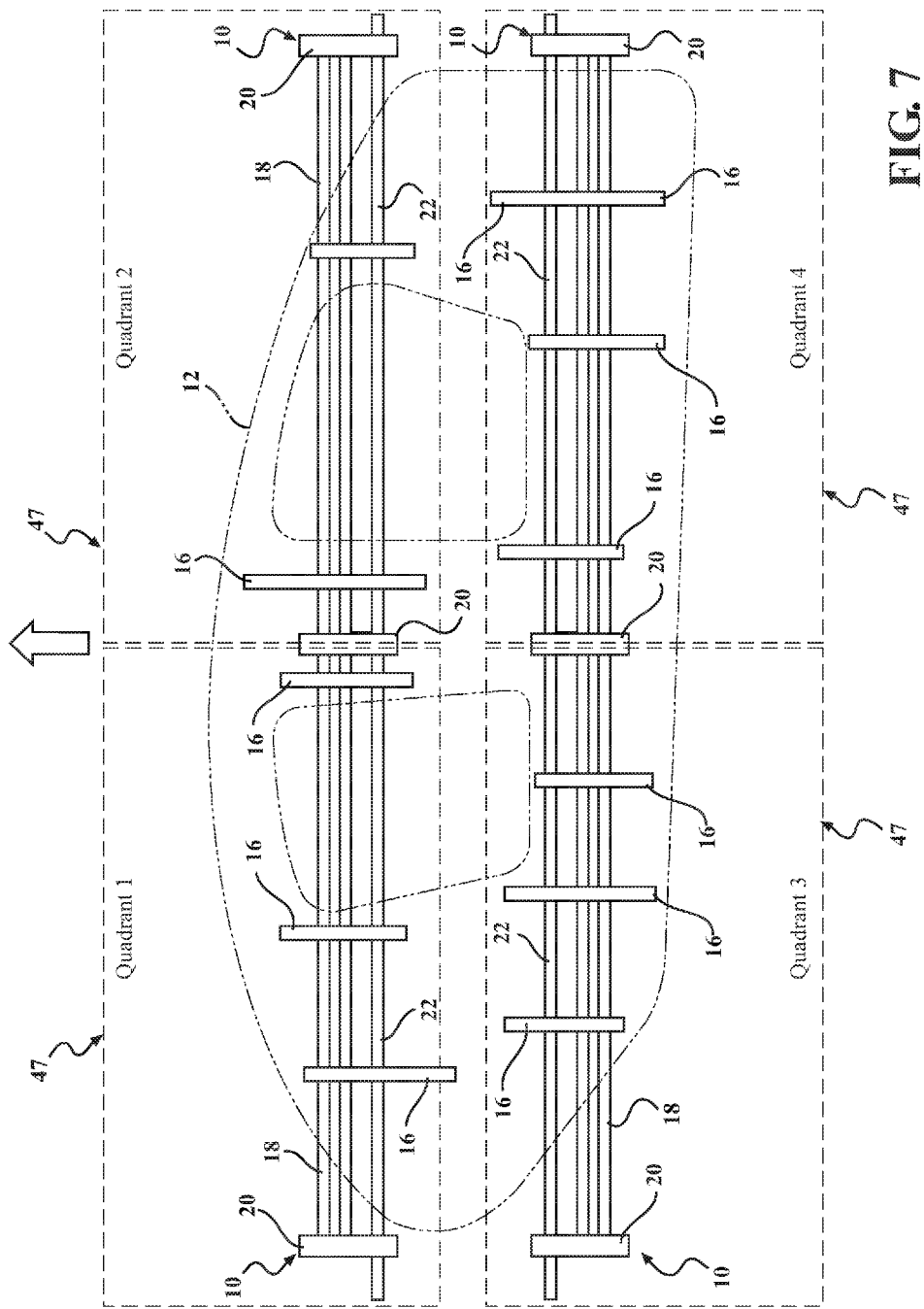
FIG. 7 is a schematic view of the apparatus for supporting a workpiece used to support four quadrants of a workpiece.

In order to support larger workpieces 12, a plurality of apparatuses 10 may be used in conjunction with one another to properly support the workpiece 12, as seen in FIG. 7. In the case of large workpieces 12, the workpiece 12 may be divided into quadrants 47, for instance, quadrants 1-4. Each quadrant 47 has its own apparatus 10 for supporting the workpiece 12. Adjacent apparatuses 10 may share a common support member 20 when the apparatuses 10 are aligned next to one another in an end-to-end fashion. The apparatuses 10 may also be aligned in a parallel fashion.

Figure 8:
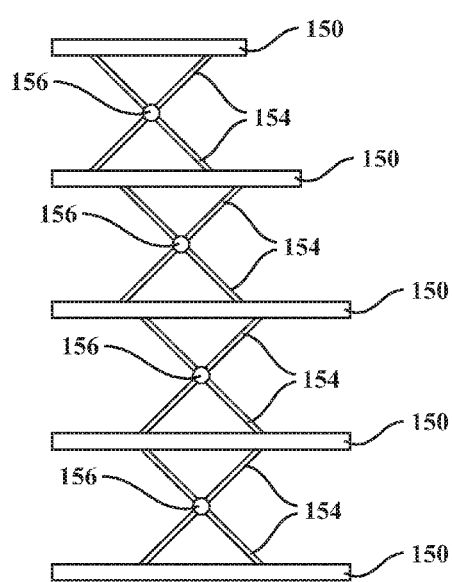
FIG. 8 is a front view of a second embodiment of an apparatus for supporting a workpiece having cross pivoting linkages in an extended, in-use position.
Figure 9:
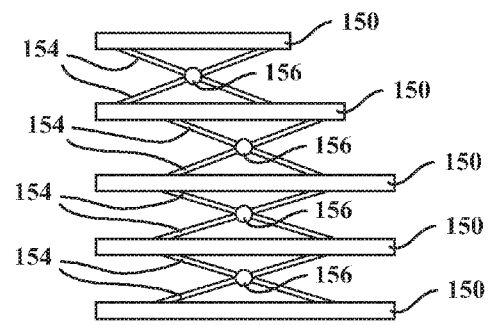
FIG. 9 is a front view of the second embodiment of the apparatus for supporting a workpiece having cross pivoting linkages in a stored position.
Figure 10:
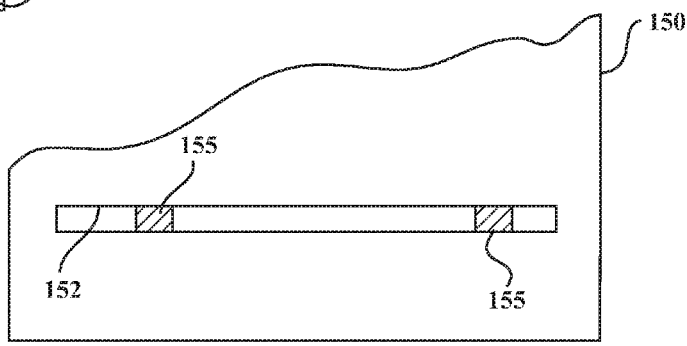
FIG. 10 is a side view of the second embodiment of the apparatus for supporting a workpiece having cross pivoting linkages.

In a second embodiment, an accordion slide configuration assists installation of the gauge slice templates and provides for a simpler and more organized fashion of storing the gauge slice templates when not in use. As seen in FIGS. 8-10, gauge slice templates 150 may have a similar configuration as previously described; however, the gauge slice templates 150 also each have a horizontal slot 152 that extends through the gauge slice templates 150. A pair of substantially cross pivoting linkages 154 extend between opposing gauge slice templates 150 such that the ends 155 of the cross pivoting linkages 154 slidably engage the slots 152 of the gauge slice templates 150. The cross pivoting linkages 154 are pivotally connected by a pivot pin 156 which allows the cross pivoting linkages 154 to pivot and fold in a stored position when not in use or extend outward in an extended position when in use, as seen in FIG. 8. When the cross pivoting linkages 154 fold into the stored position, as seen in FIG. 9, the gauge slice templates 150 are allowed to stack upon one another, thereby creating an efficient and orderly way of storing the gauge slice templates 150 when not in use. When the cross pivoting linkages 154 extend outward for use, as seen in FIG. 8, the gauge slice templates 150 may be positioned on the locking rod 122 and the master template 18 of the base structure 17 of the apparatus 10 of the first embodiment. By extending the cross pivoting linkages 154 outward, the gauge slice templates 150 can be easily and quickly assembled.

Figure 11:
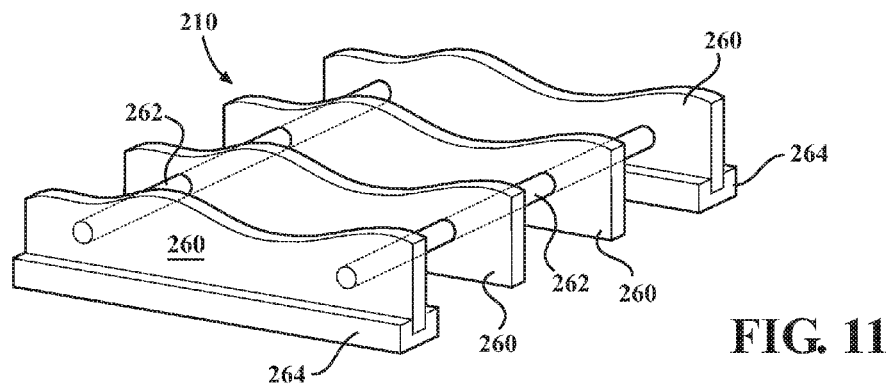
FIG. 11 is a schematic diagram of a third embodiment of an apparatus for supporting a workpiece using a stacking configuration for storing the apparatus.

In a third embodiment, an apparatus 210 for supporting a workpiece provides for gauge slice templates 260 that slide telescopically, as seen in FIG. 11. The gauge slice templates 260 are connected to one another through the use of a pair of substantially similar and parallel telescopic rods 262. A pair of substantially U-shaped brackets 264 is connectable to the gauge slice templates 260 and the U-shaped brackets 264 are disposed on the ends of a support structure for the apparatus 210. The U-shaped brackets 264 are removably connected to the support structure through conventional fasteners (not shown). When storing the apparatus 210, the U-shaped brackets 264 are removed from the support structure, and the rods 262 are telescopically collapsed such that the gauge slice templates 260 stack upon one another. This allows for an efficient and organized way of storing the gauge slice templates 260 when not in use. In order to use the gauge slice templates 260, the telescopic rods 262 are extended telescopically outward such that the gauge slice templates 260 are spaced in their proper locations. The U-shaped brackets 264 are secured to the support structure so that the apparatus 10 can be utilized.

In operation, the support members 20, the master template 18, and the locking rod 22 are connected to the support structure. The appropriate set of gauge slice templates 16 for gauging and supporting a predetermined workpiece 12 in a nested configuration are assembled to the apparatus 10 by matching the indicia 36 on the gauge slice templates 16 to the indicia 34 adjacent the slots 26 provided on the master template 18. The gauge slice templates 16 are inserted in the slots 26 of the master template 18, and the gauge slice templates 16 receive the locking rod 22 by passing through the tapered slot 42 into the aperture 40 of the keyway 24 of the gauge slice templates 16. Once all of the gauge slice templates 16 are properly located and in place, the locking rod 22 is rotated 90° into the locked position by rotating the handle 44. The apparatus 10 is then ready to support the workpiece 12 in a nested configuration.

In order to support a different workpiece 12 configuration, the locking rod 22 is rotated 90° by turning the handle 44 and moving the locking rod 22 into the unlocked position. The gauge slice templates 16 are then removed from the apparatus 10, and a different set of gauge slice templates 16 corresponding to the different workpiece 12 is then assembled to the apparatus 10 by utilizing the same steps noted in the previous paragraph.

In a fourth embodiment, an apparatus 310 for supporting a workpiece (not shown) includes a storage template that is removably connected to a master template 322 for allowing a plurality of gauge slice templates 324 to be releasably connected to and moved between the storage template 320 and the master template 322, as seen in FIGS. 12-19. The master template 322 can be supported by a base structure that includes a plurality of support members 326 which are connected to and extend outwardly from a mounting platform 328 of the master template 322. The support members 326 of the master template 322 are connected to a mounting structure 330 used to support the apparatus 310. The mounting structure 330 may include a stamping press rail that extends substantially parallel to or longitudinally from a stamping press (not shown). This allows the workpiece to be nested or supported by the gauge slice templates 324 when the workpiece is in an idled position between stamping press operations. The mounting structure 330 is not limited to being a stamping press rail, but rather, any structure may be utilized for supporting the apparatus 310.

Figure 12:
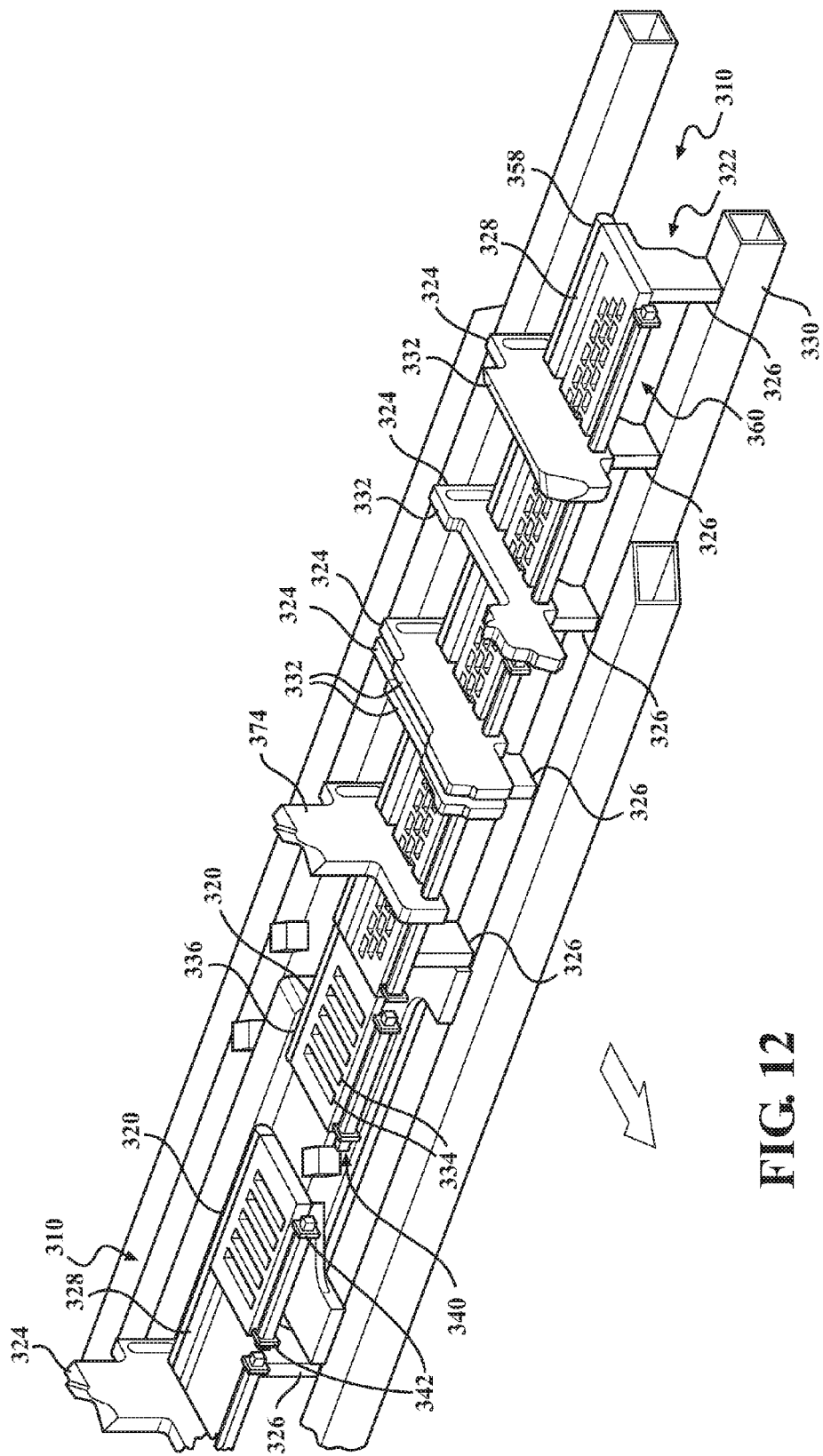
FIG. 12 is a perspective view of a fourth embodiment of an apparatus for supporting a workpiece.

The workpiece is supported and nested by the gauge slice templates 324 which are strategically located and spaced along the mounting platform 328 of the master template 322. The gauge slice templates 324 have an outer profile or contoured surface 332 that complements the shape of the workpiece so as to properly support the workpiece when transferring the workpiece to and from the apparatus 310. As seen in FIG. 12, numerous apparatuses 310 may be mounted adjacent one another along the mounting structure 330. In addition, the storage template 320 and the master template 322 may be mounted in various orientations, i.e., rotated 90° wherein the contoured surface 221 supporting the workpiece remains in the same orientation.

In order to store and exchange various gauge slice templates 324 for various shaped workpieces, the storage template 320 may be releasably and removably connected to the master template 322 of the apparatus 310. As will be described later herein, the storage template 320 is movable between a disconnected position relative to the master template 322, and a connected position relative to the master template 322. In one example usage scenario, the gauge slice templates 324 are connected to the storage template 320 when they are not in use. In order to put the gauge slice templates 324 into use, the storage template 320 is moved from a storage location to the master template 322 with the gauge slice templates 324 attached to the storage template 320. The storage template 320 is then connected to the master template 322. With the storage template 320 connected to the master template 322, the gauge slice templates are transferred from the storage template 320 to the master template 322, such as by disconnecting the gauge slice templates 324 from the storage template 320, moving the gauge slice templates 324 to their proper respective locations with respect to the master template 322, and connecting the gauge slice templates 324 to the master template 322. When use of the gauge slice templates 324 is completed, the gauge slice templates 324 are transferred back to the storage template 320, and the storage template 320 is disconnected from the master template 322. Thus, the gauge slice templates 324 can be easily stored and transported when they are not in use.

The storage template 320 may be substantially rectangular and fabricated from a lightweight, high-strength material, such as nylon. The storage template 320 has a plurality of adjacent, substantially rectangular apertures 84 extending through the storage template 320. An aperture 334 in the storage template 320 corresponds to inner profiles of the gauge slice templates 324, and therefore, the aperture 334 in the storage template 320 may have different sizes and be placed in different positions along the storage template 320. The aperture 334 in the storage templates 320 are designed to specifically receive the inner profiles of the gauge slice templates 324, which, as will be described later herein, are used to engage the master template 322. The storage template 320 also provides a substantially semi-cylindrical rail 336 that is connected to and extends along one side of the storage template 320. The rail 336 is fabricated from a high-strength, lightweight material, such as nylon, and is designed to receive a substantially semi-cylindrical aperture 338 provided in each of the gauge slice templates 324. This allows the gauge slice templates 324 to slide along the rail 336 of the storage template 320 into a stored position on the storage template 320.

The storage template 320 also provides a releasable locking rail 340 mounted on an opposite side of the storage template 320 from the semi-cylindrical rail 336. The locking rail 340 has a pair of brackets 342. The brackets 342 are connected to the side of the storage template 320 and extend outward from the storage template 320. Each of the brackets 342 provides an aperture extending therethrough for receiving a locking rod 346. The locking rod 346 has a substantially rectangular cross-section with rounded or substantially semi-cylindrical ends 349 on the cross-section of the locking rod 346. Thus, the locking rod 346 has a pair of substantially flat sides 347 with rounded ends 349 integrally formed thereon.

A handle (not shown) may be attached to the locking rod 346 for rotating the locking rod 346 between a locked position and an unlocked position. In the unlocked position, each of the gauge slice templates 324 has a substantially C-shaped aperture or keyway 350 for receiving the locking rod 346 through the opening of the C-shaped aperture 350. The locking rod 346 can only be received within the C-shaped aperture 350 of the gauge slice templates 324 when the locking rod 346 is rotated such that the flat sides 347 of the locking rod 346 are substantially perpendicular to the opening of the C-shaped aperture 350 in the gauge slice templates 324. This allows the locking rod 346 to pass through the opening in the C-shaped aperture 350 of the gauge slice templates 324. In order to rotate the locking rod 346 and move the gauge slice templates 324 into the locked position, the locking rod 346 is rotated 90° with the C-shaped aperture 350 of the gauge slice templates 324 such that the flat sides 347 of the locking rod 346 are parallel to the opening of the C-shaped aperture 350. The rounded or substantially semi-cylindrical ends 349 of the locking rod 346 are then captured within the C-shaped aperture 350 of the gauge slice templates 324, and since the width of the locking rod 346 is larger than the width of the opening in the C-shaped aperture 350 when the locking rod 346 is in the locked position, the locking rod 346 is prohibited from passing through the opening of the C-shaped aperture 350 in the gauge slice templates 324.

Figure 13:
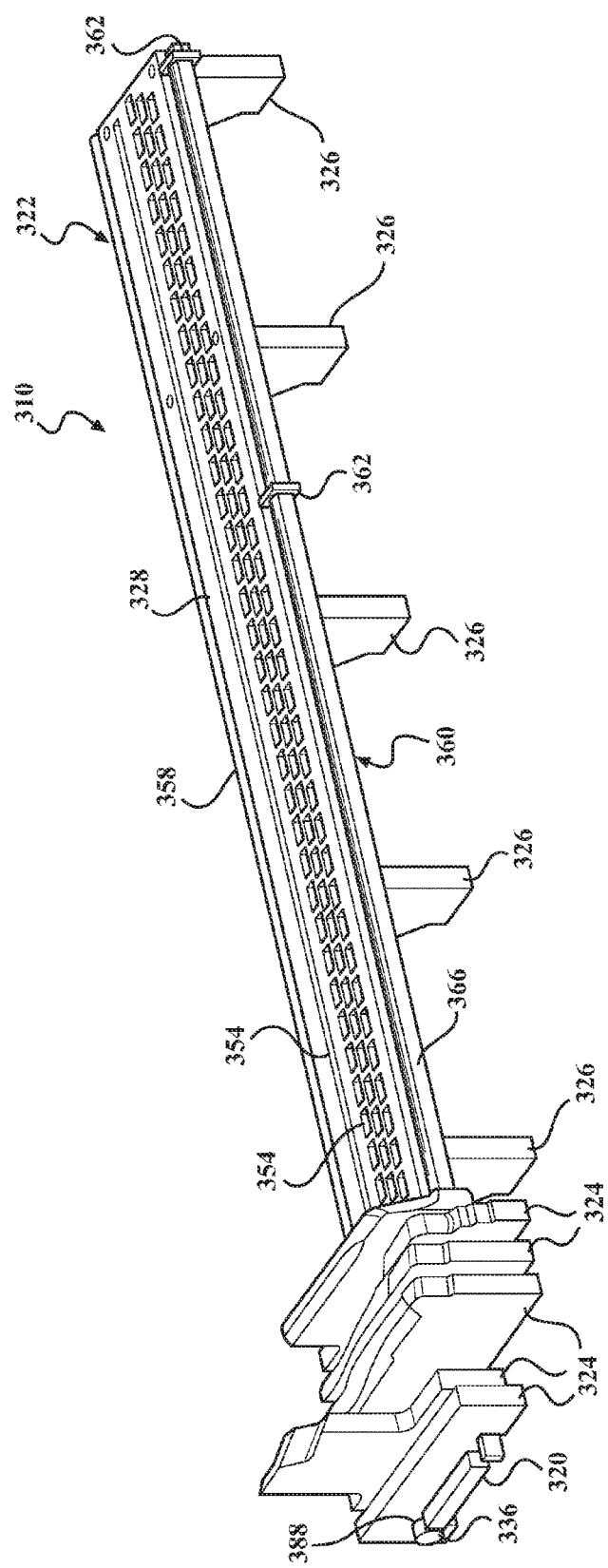
FIG. 13 is a perspective view of the fourth embodiment of the apparatus for supporting a workpiece showing the gauge slice templates in a stored position.
Figure 14:
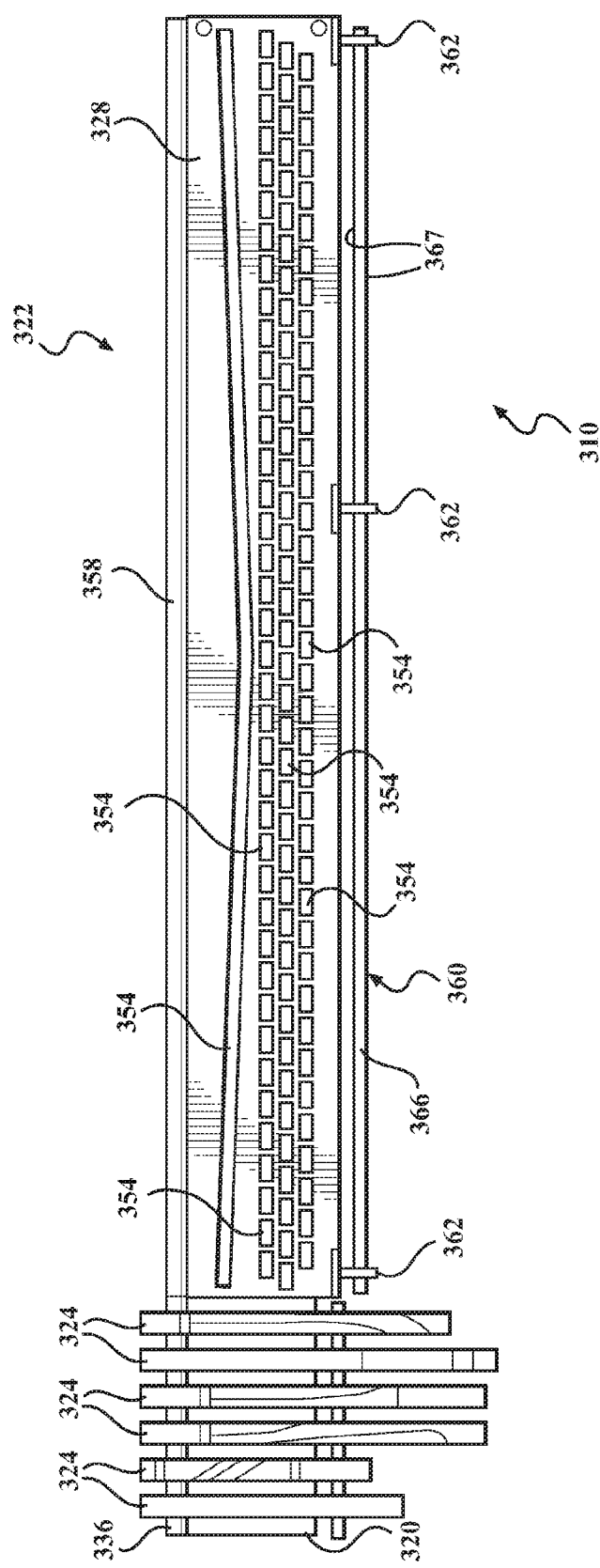
FIG. 14 is a top view of the fourth embodiment of the apparatus for supporting a workpiece of the present invention showing the gauge slice templates in a stored position.

To move the gauge slice templates 324 between the storage template 320 and the master template 322, one end of the storage template 320 slidably engages one end of the master template 322 through a tongue-and-groove arrangement. When the storage template 320 is connected to the master template 322, the storage template 320 effectively becomes an extension of the master template 322, as the storage template 320 is longitudinally aligned with the master template 322. A handle (not shown) may be connected to one end of the storage template 320 to assist in mounting the storage template 320 to the master template 322 and also to assist in carrying the storage template 320 to and from the master template 322 when the storage template 320 has the gauge slice templates 324 stored thereon. When the gauge slice templates 324 are mounted and stored on the storage template 320, as seen in FIGS. 13-14, the gauge slice templates 324 are closely aligned and adjacent one another, thereby limiting the space required to store the gauge slice templates 324 on the storage template 320. As previously discussed, the gauge slice templates 324 are positioned on the storage template 320 by having the semi-cylindrical aperture 338 in the gauge slice templates 324 receive the rail 336 on the storage template 320. In addition, the inner profile of the gauge slice templates 324, which are used to engage apertures 354 in the mounting platform 328, are received by the apertures 334 in the storage template 320. Lastly, the C-shaped aperture 350 in each of the gauge slice templates 324 receives the locking rod 346 of the locking rail 340 in order to secure and lock the gauge slice templates 324 onto the storage templates 320 in the locked position.

In order to support the gauge slice templates 324 when used to nest or support the workpiece, the mounting platform 328 of the master template 322 is connected to the support members 326, as previously described and seen in FIGS. 12-17. The mounting platform 328 has a substantially rectangular configuration and may be fabricated from a high-strength, lightweight material, such as nylon. The plurality of uniquely positioned apertures 354 extend through the mounting platform 328 and are designed to receive protrusions 356 on the inner profile of each of the gauge slice templates 324. The protrusions 356 on the gauge slice templates 324 serve as engagement features for engaging the master template 322 and are uniquely positioned on each of the gauge slice templates 324 such that the protrusion 356 of each of the gauge slice templates 324 can only be received by the correspondingly positioned apertures 354 in the mounting platform 328 of the master template 322. This ensures for the proper longitudinal positioning of the gauge slice templates 324 along the mounting platform 328 of the master template 322. In particular, the protrusions 356 and the apertures 354 can be configured such that each gauge slice template 324 can only be installed at a single predetermined location. Thus, the gauge slice templates 324 are prevented from being installed at an incorrect location. Thus, the apertures 354 of the master template 322 serve as positioning features of the master template 322 that define predetermined longitudinal positions for the gauge slice templates 324 with respect to the master template 322. Moreover, in some implementations, the master template 322 and the gauge slice templates 324 can be configured such that cooperation of the positioning features of the master template 322 with features on the gauge slice templates 324 can define a unique, discrete, longitudinal position for each of the gauge slice templates 324, such that each gauge slice template 324 is connectable to the master template 322 only at a specific predetermined longitudinal position with respect to the master template 322. Corresponding indicia (not shown) may be utilized on the gauge slice templates 324 and the master template 322 to indicate where the gauge slice templates 324 are to be located on the mounting platform 328 of the master template 322.

To allow the gauge slice templates 324 to slide into proper position along the mounting platform 328 of the master template 322, a rail 358 is connected to one side of the mounting platform 328 of the master template 322. The rail 358 can have a curved surface, and in some implementations, can be semi-cylindrical or can include a semi-cylindrical portion. The rail 358 that is connected to the mounting platform 328 is similar to the rail 336 that is connected to the storage template 320, and the rails 358, 336 are longitudinally aligned when the storage template 320 is connected to the master template 322. This allows the gauge slice templates 324 to freely slide between the storage template 320 and the master template 322 by having the semi-cylindrical aperture 338 in the gauge slice templates 324 receive the rails 336, 358 of the storage template 320 and the mounting platform 328, respectively.

In order to lock the gauge slice templates 324 in place on the mounting platform 328 of the master template 322, a locking rail 360, similar to the locking rail 340 provided on the storage template 320, is provided on the master template 322. The locking rail 360 provides several brackets 362 connected to a side of the mounting platform 328 opposite the side of the mounting platform 328 for which the rail 358 is connected thereto. Each of the brackets 362 has an aperture extending therethrough for receiving a locking rod 366. The locking rod 366 has the same configuration as the locking rod 346 on the storage template 320 in that it provides a substantially rectangular cross-section having substantially semi-circular or rounded ends. Thus, the locking rod 366 has a pair of substantially parallel flat sides 367 and rounded ends 369 connected thereto. The locking rod 366 is received by the substantially C-shaped apertures 350 provided in the gauge slice templates 324. As similarly described with regard to the storage template 320, the locking rod 366 rotates between an unlocked position, wherein the parallel sides 367 of the locking rod 366 are substantially perpendicular to the opening in the C-shaped aperture 350 in the gauge slice templates 324. In the locked position, the locking rod 366 is rotated 90° from that of the unlocked position such that the parallel sides 367 of the locking rod 366 are substantially parallel to the opening in the C-shaped aperture 350 of the gauge slice templates 324. The rounded or semi-cylindrical ends 369 of the locking rod 366 are then larger than the opening in the C-shaped aperture 350 in the gauge slice templates 324, and thus, the locking rod 366 is captured by the gauge slice templates 324. A handle (not shown) may be connected to the locking rod 366 to allow for the easy rotation of the locking rod 366.

Figure 18:
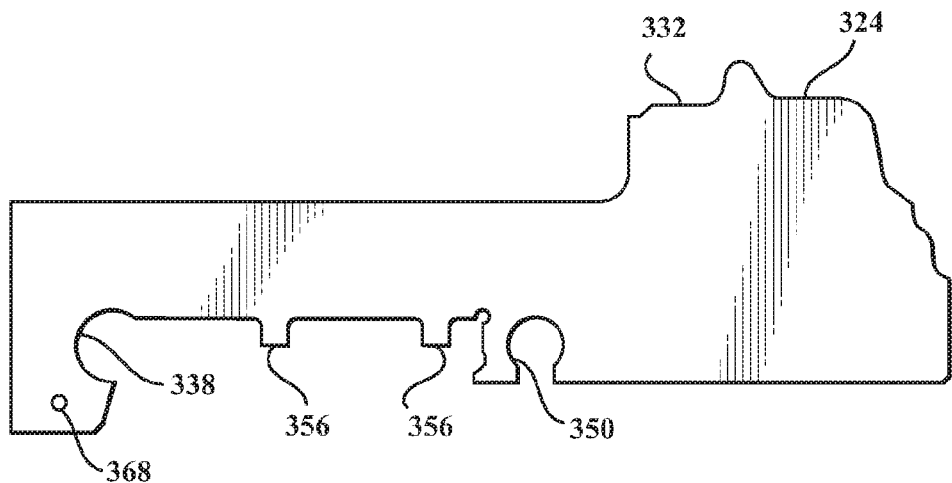
FIG. 18 is a side view of a first gauge slice template of the fourth embodiment of the apparatus for supporting a workpiece.
Figure 19:
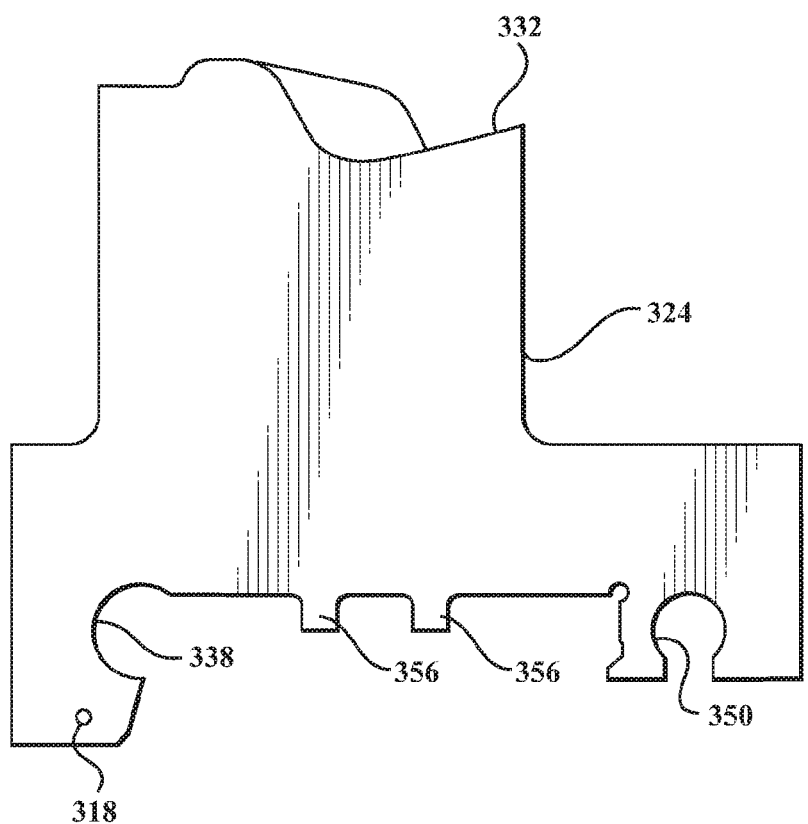
FIG. 19 is a side view of a second gauge slice template of the fourth embodiment of the apparatus for supporting a workpiece.

FIGS. 18-19 show two of the gauge slice templates 324 having the protrusions 356 uniquely positioned on their inner profile to engage the apertures 354 in the mounting platform 328 of the master template 322. A small aperture 368 may extend through each of the gauge slice templates 324, wherein the apertures 368 are coaxially aligned along a common longitudinal axis when the gauge slice templates 324 are mounted on the master template 322 in the locked position. A safety alignment system (not shown) may be utilized, whereby a laser (not shown) is mounted at one end of the apparatus 310 and positioned to pass a laser through the corresponding apertures 368 in the gauge slice templates 324. At the opposite end of the apparatus 310, a laser receiver (not shown) may be provided to receive and indicate that the laser has reached the receiver. When the receiver receives the laser, the safety alignment system provides an indicator that the gauge slice templates 324 are properly locked in place on the master template 322. If the receiver does not receive the laser, then the receiver indicates to the safety alignment system that the gauge slice templates 324 are not properly located, and the safety alignment system provides an appropriate warning.

In operation, the apparatus 310 may be utilized to nest or support a variety of workpieces having different configurations, as seen in FIGS. 13-14. Each workpiece having a different configuration corresponds to a different set of gauge slice templates 324 having contoured configurations that correspond to the appropriate workpiece. To accomplish this task, a different set of gauge slice templates 324 are provided for the specific configuration of each workpiece. In doing so, each set of gauge slice templates 324 are stored on a particular storage template 320. Separate storage templates 320 with the appropriate gauge slice templates 324 are stored thereon and provided for each workpiece having a different configuration.

Figure 15:
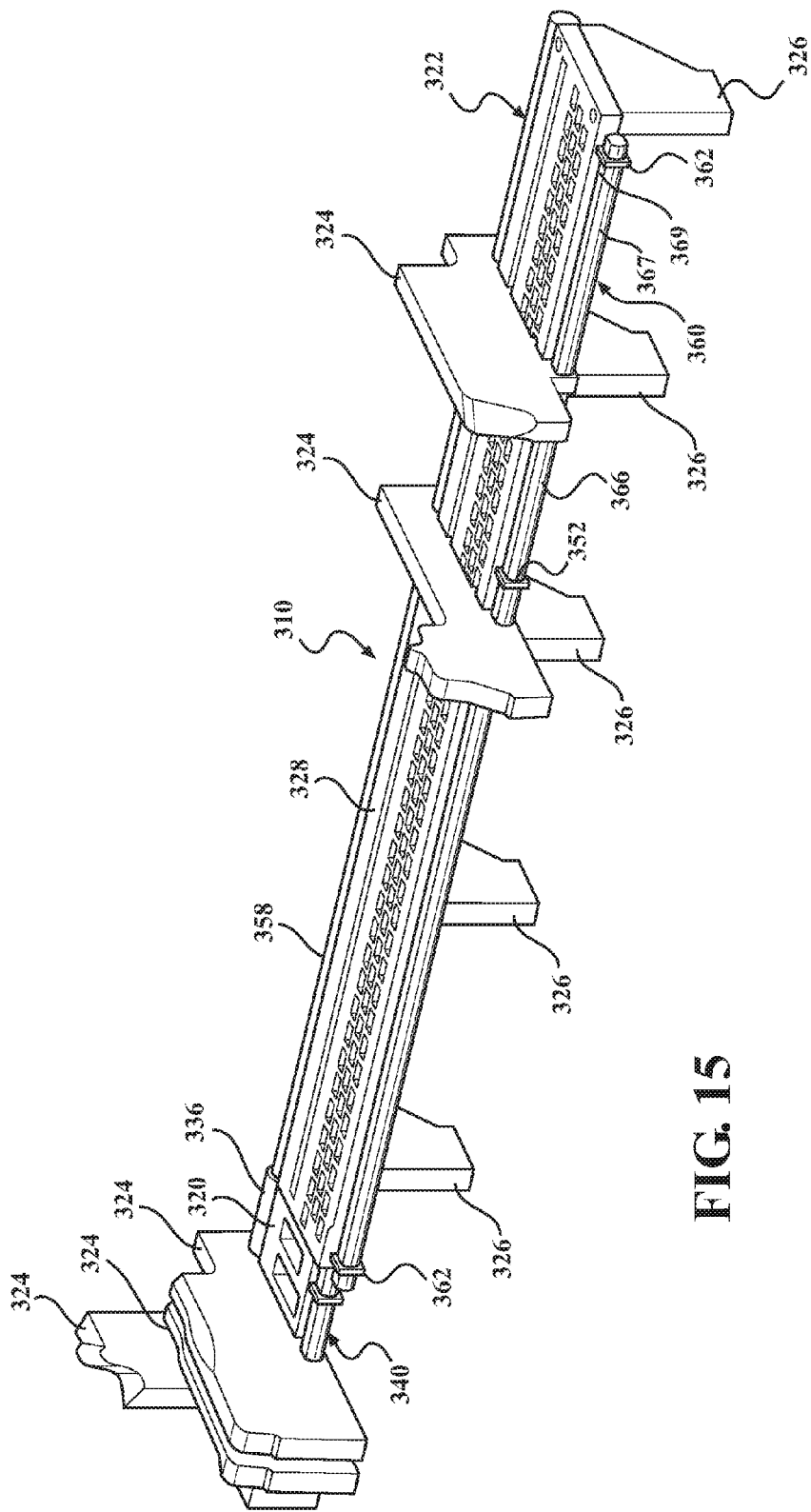
FIG. 15 is a perspective view of the fourth embodiment of the apparatus for supporting a workpiece showing the gauge slice templates in a partially stored and in use position.
Figure 16:
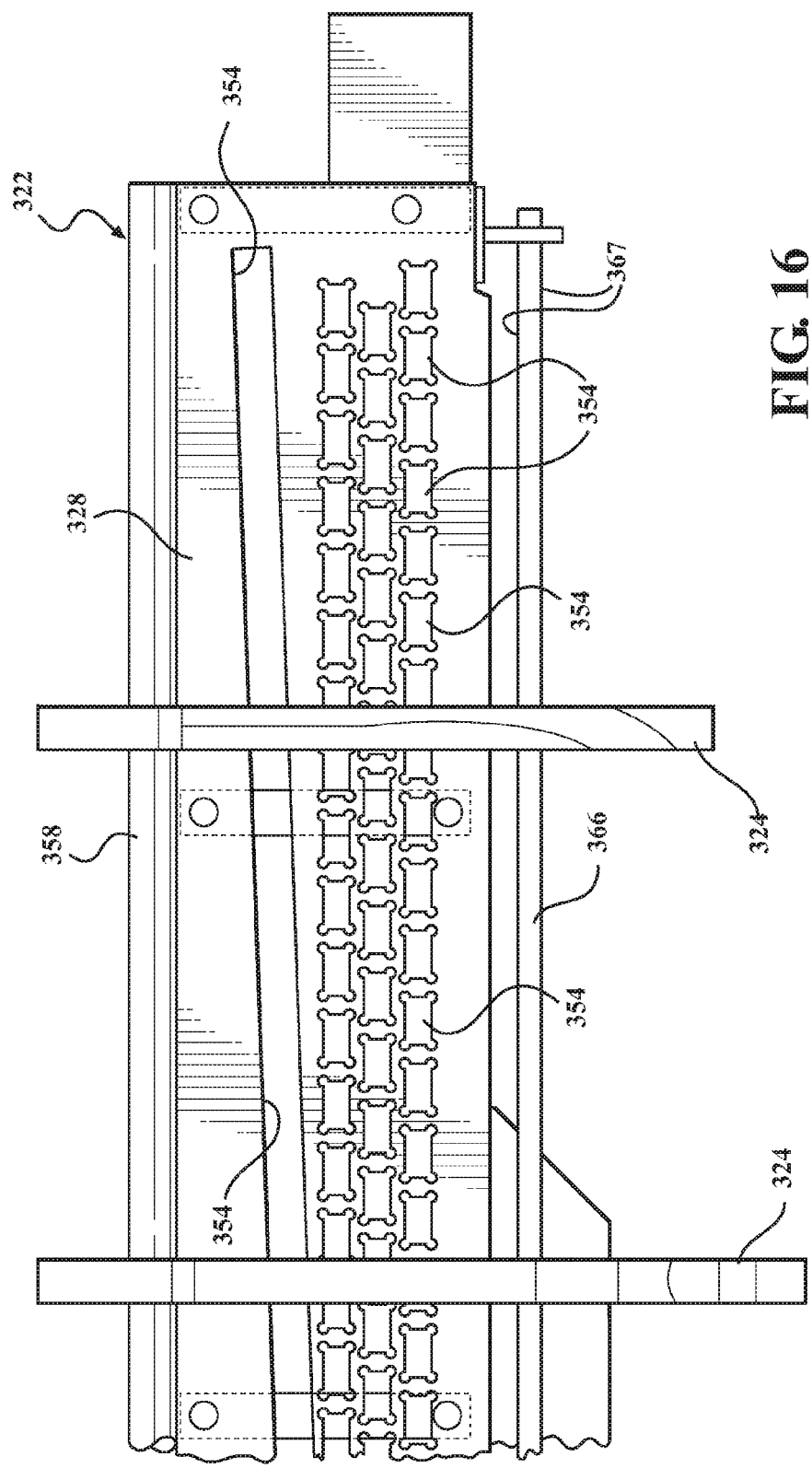
FIG. 16 is a top view of the fourth embodiment of the apparatus for supporting a workpiece showing the gauge slice templates in an in-use position.
Figure 17:
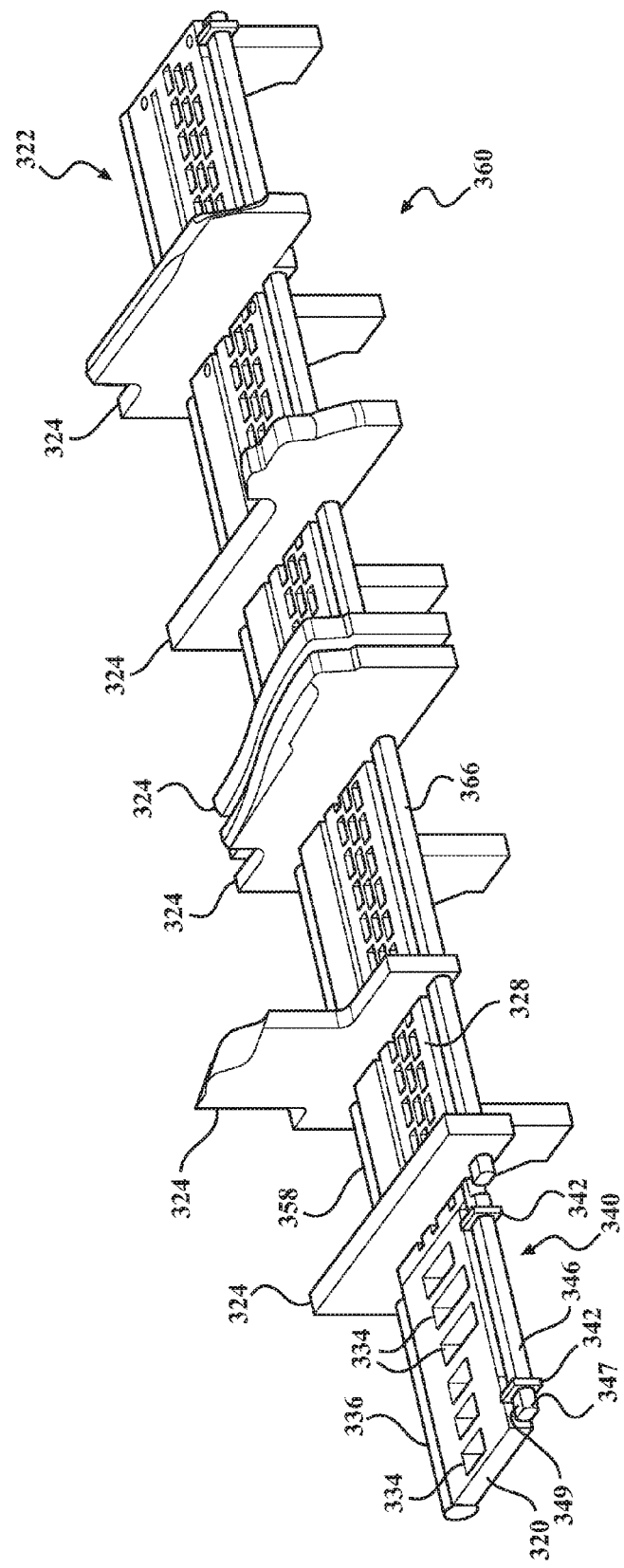
FIG. 17 is a perspective view of the fourth embodiment of the apparatus for supporting a workpiece showing the gauge slice templates in an in-use position.

When a particular workpiece is being produced, the appropriate storage template 320 having the appropriate gauge slice templates 324 mounted thereon is selected and connected to the master template 322. The locking rod 346 on the storage template 320 is rotated to the unlocked position, and each of the gauge slice templates 324 is pivoted upward on the rail 336 away from the locking rod 346 and the apertures 334 in the storage template 320. Each of the gauge slice templates 324 is slid from the rail 336 on the storage template 320 to the rail 358 on the mounting platform 328 of the master template 322, as seen in FIGS. 15-17. Indicia on the gauge slice templates 324 and the master template 322 are aligned such that the gauge slice templates 324 are properly positioned on the master template 322. The gauge slice templates 324 are then pivoted downward such that the protrusions 356 on the gauge slice templates 324 engage corresponding apertures within the mounting platform 328 of the master template 322. The C-shaped apertures 350 in the gauge slice templates 324 receive the locking rod 366 on the master template 322. The locking rod 366 is rotated toward the locking position so as to secure the gauge slice templates 324 to the master template 322. If the safety alignment system provides an indicator that the gauge slice templates 324 are properly aligned, then the apparatus 310 is ready to receive the workpiece. If the safety alignment system indicates that the gauge slice templates 324 are not properly aligned, then the gauge slice templates 324 must be inspected and properly mounted until the safety alignment system indicates that the gauge slice templates 324 are in their proper positions.

In order for the apparatus 310 to be used for a workpiece having a different configuration, the locking rod 366 of the master template 322 is rotated to the unlocked position, and the gauge slice templates 324 are pivoted upward on the rail 358 away from the locking rod 316 and the apertures 354 provided in the mounting platform 328 of the master template 322. The gauge slice templates 324 are slid along the rail 358 toward and on the rail 336 of the storage template 320. All of the gauge slice templates 324 are moved onto the storage template 320, wherein the gauge slice templates 324 are pivoted downward such that the protrusions 356 engage the apertures 334 in the storage template 320, and the C-shaped aperture 350 in the gauge slice templates 324 engage the locking rod 346 on the storage template 320. The locking rod 346 on the storage template 320 is rotated toward the locked position to secure the gauge slice templates 324 on the storage template 320. The storage template 320 is then disengaged and removed from the master template 322 and taken to a storage location. A separate storage template 320 having appropriately shaped gauge slice templates 324 for a differently-contoured workpiece is then connected to the master template 322, and the gauge slice templates 324 are moved onto the master template 322 as previously described.

Figure 20:
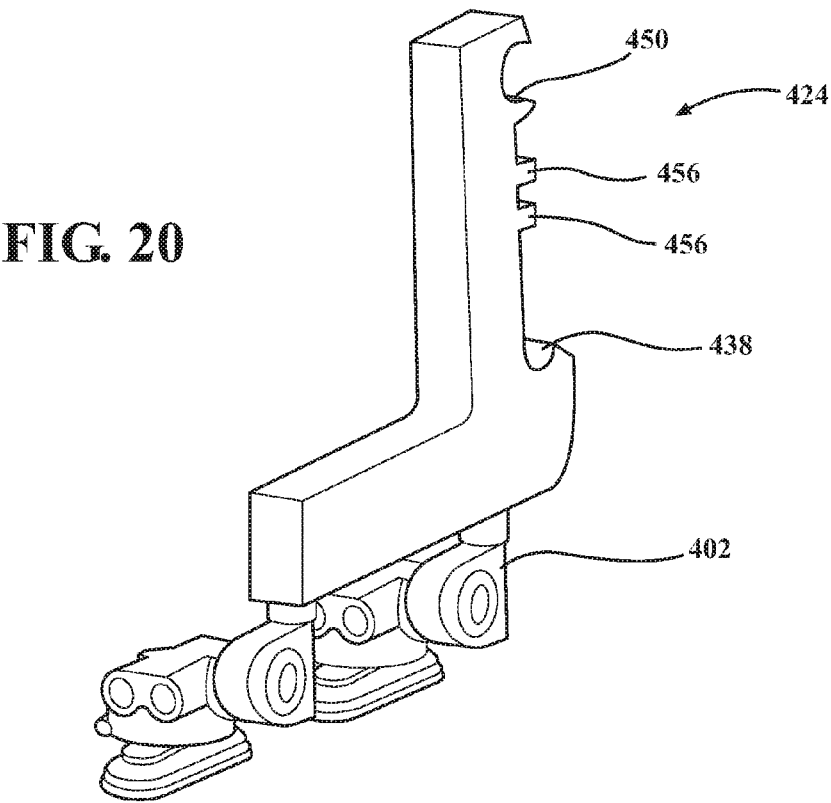
FIG. 20 is a side view of a first gauge slice template of a fifth embodiment of the apparatus for supporting a workpiece.
Figure 21:
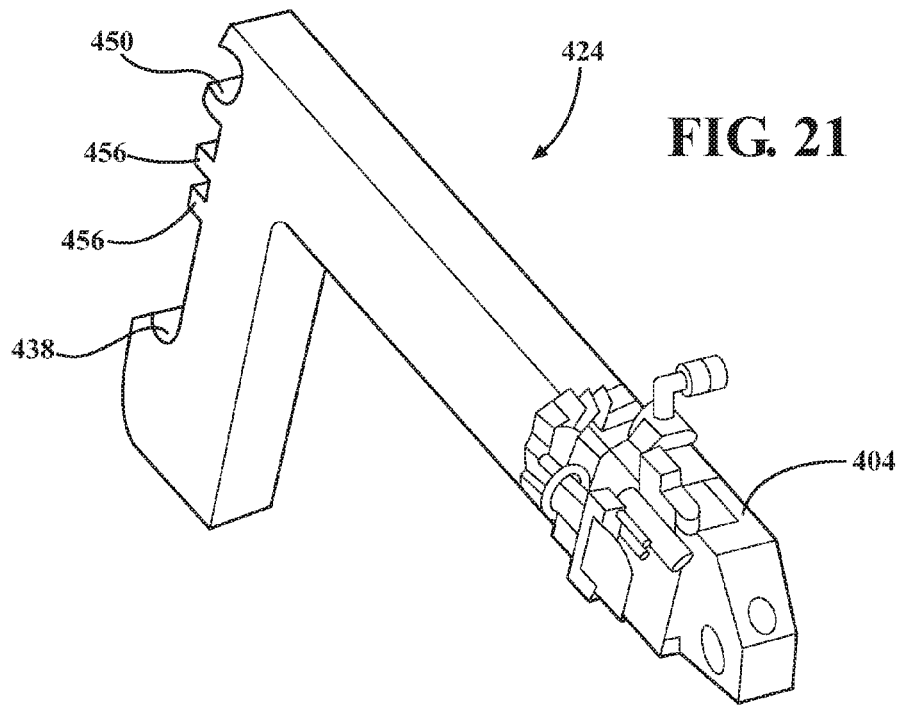
FIG. 21 is a side view of a second gauge slice template of the fifth embodiment of the apparatus for supporting a workpiece.

In the previous embodiments, the gauge slice templates include workpiece engaging structures in the form of contoured surfaces that are formed on the gauge slice templates themselves. In a fifth embodiment, gauge slice templates 424 include workpiece engaging structures in the form of tools that are connected to and supported by the gauge slice templates 424, as shown in FIGS. 20-21. Similar to the gauge slice templates 324 that were described in connection with the previous embodiment, the gauge slice templates 424 include protrusions 456, a cylindrical aperture 438, and a C-shaped aperture 450. The gauge slice templates 424 each include one or more tools, such as vacuum grippers 402 (FIG. 20) or power-operated clamps 404 (FIG. 21), which serve as workpiece engaging structures.

Figure 22:
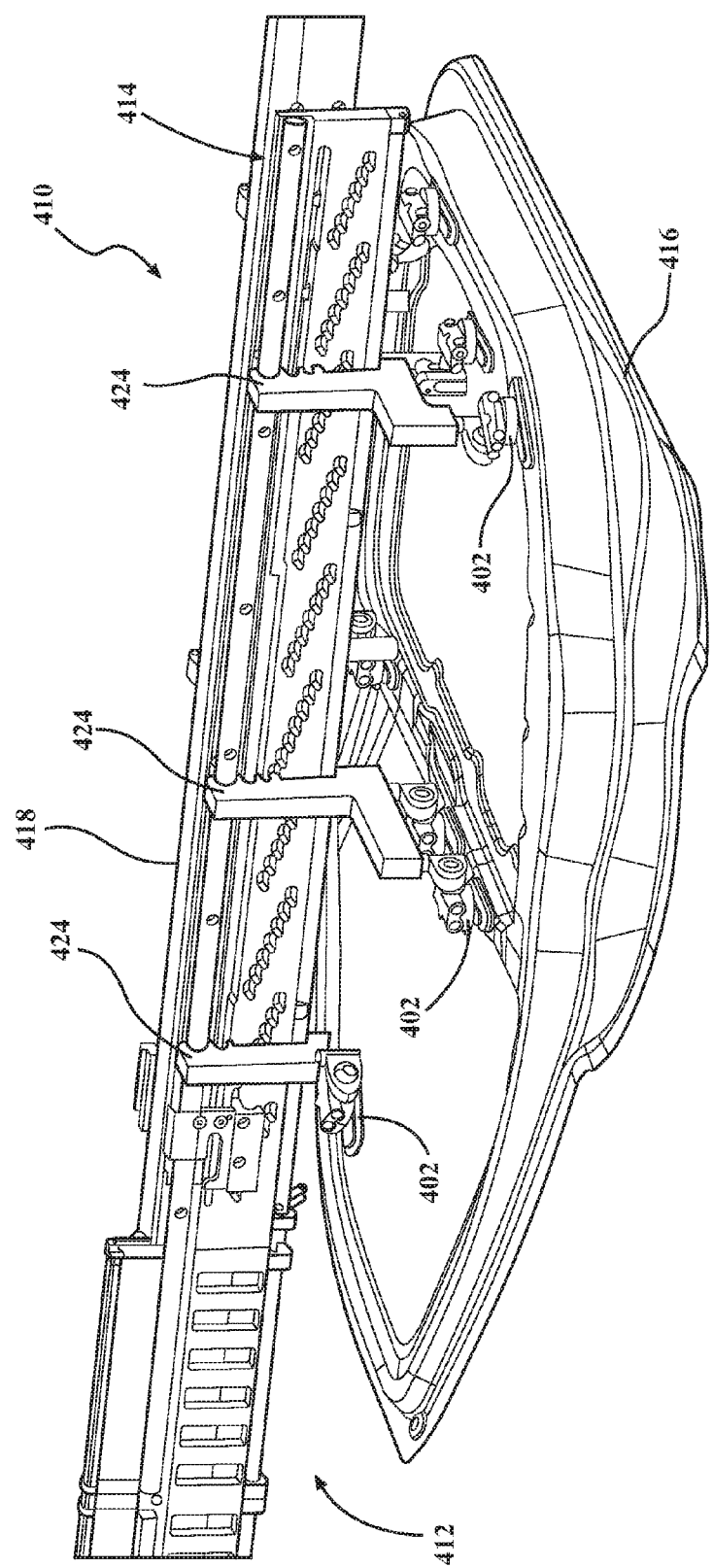
FIG. 22 is a perspective view of a first example implementation of the fifth embodiment of the apparatus for supporting a workpiece.

As shown in FIG. 22, a first implementation of an apparatus 410 of the fifth embodiment includes a storage template 412 and a master template 414, which are as described with respect to FIGS. 12-19. The gauge slice templates 424 are connected to the master template 414 for supporting a workpiece 416 using tools such as vacuum grippers 402. The storage template 412 and the master template 414 are supported by a movable rail 418, which is moveable by a workpiece transfer system, such as a tri-axis system or a robotic arm.

Figure 23:
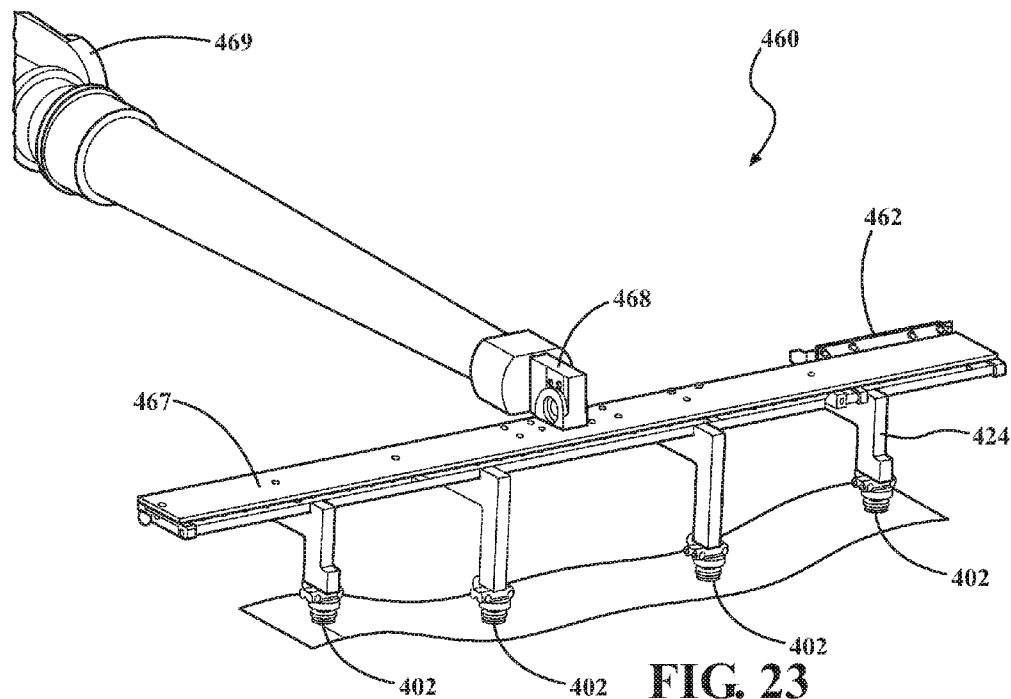
FIG. 23 is a perspective view of a second example implementation of the fifth embodiment of the apparatus for supporting a workpiece.

As shown in FIG. 23, a second implementation of an apparatus 460 of the fifth embodiment includes a storage template 462 and a master template 464, which are as described with respect to FIGS. 12-19. The gauge slice templates 424 are connected to the master template 464 for supporting a workpiece 466 using tools such as vacuum grippers 402. The storage template 462 and the master template 464 are mounted to a support member 467 having a coupling 468 that is removably connectable to a robotic arm 469 or other workpiece transfer system.

Figure 24:
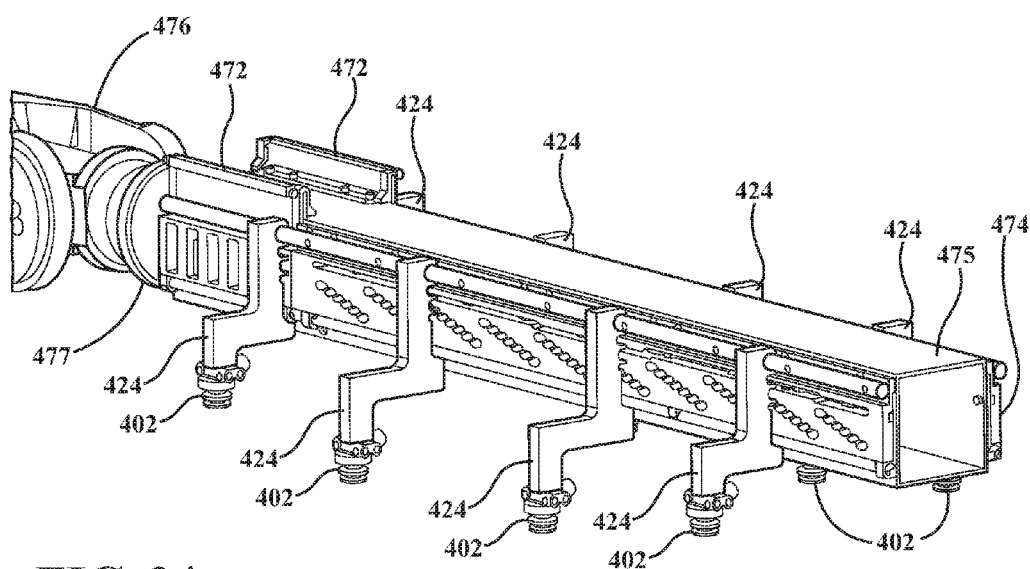
FIG. 24 is a perspective view of a third example implementation of the fifth embodiment of the apparatus for supporting a workpiece.

As shown in FIG. 24, a third implementation of an apparatus 470 of the fifth embodiment includes first and second storage templates 472, and first and second master templates 474, which are as described with respect to FIGS. 12-19, and are mounted on first and second sides of a beam 475. The gauge slice templates 424 are connected to the master template 474 for supporting a workpiece (not shown in FIG. 24) using tools such as vacuum grippers 402. The beam 475 is removably connected to a robotic arm 476 or other workpiece transfer system by a coupling 477.

While the disclosure herein is made in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An apparatus for supporting a workpiece, comprising:
a master template that includes a plurality of positioning features;
a locking assembly that is connected to the master template, is movable with respect to the master template between a locked position and an unlocked position, and engageable with a plurality of gauge slice templates at spaced apart positions along the locking assembly; and
the plurality of gauge slice templates each having a first planar side surface, a second planar side surface, and a workpiece engaging structure that extends between the first and second planar side surfaces and is engageable with the workpiece for supporting the workpiece, each gauge slice template releaseably engaging at least one of the positioning features of the master template,
wherein the plurality of gauge slice templates do not move when the locking assembly moves between the locked position and the unlocked position such that the plurality of gauge slice templates are not moveable with respect to the master template when the locking assembly is in the locked position, and the plurality of gauge slice templates are moveable with respect to the master template when the locking assembly is in the unlocked position.

2. The apparatus of claim 1, wherein the locking assembly includes a locking rod that is rotatable with respect to the master template between the locked and unlocked positions, and each gauge slice template includes a keyway in which the locking rod of the locking assembly is received.

3. The apparatus of claim 2, wherein the locking rod is moveable into and out of the keyway of each gauge slice template when the locking rod is in the unlocked position, and the locking rod is retained within the keyway of each gauge slice template when the locking rod is in the locked position.

4. The apparatus of claim 1, wherein each positioning feature from the plurality of positioning features corresponds to a predetermined longitudinal position for a respective gauge slice template from the plurality of gauge slice templates.

5. The apparatus of claim 1, wherein each of the gauge slice templates includes an engaging feature for engagement with a respective positioning feature from the plurality of positioning features of the master template.

6. The apparatus of claim 5, wherein each of the plurality of positioning features includes an aperture, and the engaging feature of each gauge slice template from the plurality of gauge slice templates includes a protrusion.

7. The apparatus of claim 1, further comprising:
a base structure for supporting the master template.

8. The apparatus of claim 7, wherein the base structure includes a plurality of support members that are connected to the master template.

9. The apparatus of claim 7, wherein the master template is removably connected to the base structure.

10. The apparatus of claim 1, wherein the master template is substantially planar.

11. The apparatus of claim 10, wherein the gauge slice templates extend substantially perpendicular to the master template.

12. The apparatus of claim 1, wherein the workpiece engaging structure is a contoured surface that is formed on the gauge slice template and is complementarily engageable with the workpiece.

13. An apparatus for supporting a workpiece, comprising:
a base structure;
a substantially planar master template that is connected to the base structure and includes a plurality of positioning features;
a locking rod that is connected to the master template and is movable with respect to the master template between a locked position and an unlocked position; and
a plurality of substantially planar gauge slice templates each associated with a workpiece engaging structure that is engageable with the workpiece for supporting the workpiece, each gauge slice template including an engaging feature for releasable engagement with a respective positioning feature from the plurality of positioning features of the master template,
wherein the engaging features and the positioning features cooperate to define a single predetermined longitudinal position for each gauge slice template with respect to the master template, the locking rod engages the plurality of gauge slice templates at the predetermined longitudinal positions along the locking rod, the gauge slice templates do not move when the locking rod moves between the locked position and the unlocked position such that the gauge slice templates are not moveable with respect to the master template when the locking rod is in the locked position, and the gauge slice templates are moveable with respect to the master template when the locking rod is in the unlocked position.

14. The apparatus of claim 13, wherein each gauge slice template includes a keyway in which the locking rod is received.

15. The apparatus of claim 14, wherein the locking rod is moveable into and out of the keyway of each gauge slice template when the locking rod is in the unlocked position, and the locking rod is retained within the keyway of each gauge slice template when the locking rod is in the locked position.

16. The apparatus of claim 13, wherein the gauge slice templates extend substantially perpendicular to the master template.

17. An apparatus for supporting a workpiece, comprising:
a base structure;
a substantially planar master template that extends in a longitudinal direction, is connected to the base structure, and includes a plurality of positioning features spaced apart in the longitudinal direction;
a locking rod that extends in the longitudinal direction along the master template and is rotatably connected to the base structure rotatable with respect to the master template between a locked position and an unlocked position; and
a plurality of substantially planar gauge slice templates each associated with a workpiece engaging structure that is engageable with the workpiece for supporting the workpiece, each gauge slice template releaseably engaging at least one positioning feature of the master template, and each gauge slice template having a keyway in which the locking rod is received for engaging the locking rod, wherein the keyway of each gauge slice template extends longitudinally through each gauge slice template and has an open side,
wherein the locking rod is moveable into and out of the keyway of each gauge slice template when the locking rod is in the unlocked position, the locking rod engages the plurality of gauge slice templates and is retained within the keyway of each gauge slice template when the locking rod is in the locked position, each positioning feature from the plurality of positioning features corresponds to a predetermined longitudinal position for a respective gauge slice template from the plurality of gauge slice templates, and each of the gauge slice templates includes an engaging feature for engagement with a respective positioning feature from the plurality of positioning features of the master template.

* * * * *